(12) United States Patent
Clapper et al.

(10) Patent No.: US 10,550,979 B2
(45) Date of Patent: Feb. 4, 2020

(54) SYSTEM FOR CONDUIT SQUEEZE RETAINER

(71) Applicant: North American Pipe Corporation, Houston, TX (US)

(72) Inventors: Joshua E. Clapper, Downingtown, PA (US); Dmitry Yashin, Haverford, PA (US); Roy L. Dean, Schwenksville, PA (US)

(73) Assignee: NORTH AMERICAN PIPE CORPORATION, Houston, TX (US)

( * ) Notice: Subject to any disclaimer, the term of this patent is extended or adjusted under 35 U.S.C. 154(b) by 0 days.

(21) Appl. No.: 15/882,696

(22) Filed: Jan. 29, 2018

(65) Prior Publication Data
US 2018/0216766 A1    Aug. 2, 2018

Related U.S. Application Data

(60) Provisional application No. 62/453,901, filed on Feb. 2, 2017, provisional application No. 62/459,040, filed on Feb. 14, 2017, provisional application No. 62/560,045, filed on Sep. 18, 2017.

(51) Int. Cl.
*F16L 37/088*    (2006.01)

(52) U.S. Cl.
CPC ......... *F16L 37/088* (2013.01); *F16L 2201/10* (2013.01)

(58) Field of Classification Search
CPC .. F16L 37/088; F16L 37/0842; F16L 37/0844
USPC ......... 285/93, 305, 307, 308, 309, 321, 403, 285/902
See application file for complete search history.

(56) References Cited

U.S. PATENT DOCUMENTS

| | | | | |
|---|---|---|---|---|
| 738,503 | A * | 9/1903 | Waters | F16L 37/088 131/225 |
| 1,073,850 | A | 9/1913 | Greer | |
| 1,771,949 | A | 7/1930 | Blanchard | |
| 2,410,027 | A * | 10/1946 | Guildford | F16L 19/061 285/339 |
| 2,479,960 | A * | 8/1949 | Osborn | F16L 37/084 285/104 |
| 2,805,089 | A * | 9/1957 | Hansen | F16L 37/088 285/317 |
| 2,898,130 | A * | 8/1959 | Hansen | F16L 37/088 137/614.04 |

(Continued)

FOREIGN PATENT DOCUMENTS

| | | |
|---|---|---|
| EP | 0941411 A2 | 9/1999 |
| WO | 9825035 A2 | 6/1998 |

OTHER PUBLICATIONS

International Search Report and Written Opinion for International Application No. PCT/US2018/016689, dated Apr. 5, 2018. (8 pages).

*Primary Examiner* — Aaron M Dunwoody
(74) *Attorney, Agent, or Firm* — Lempia Summerfield Katz LLC

(57) ABSTRACT

A pipe system includes a tubular body with an axis, a bore that is axial and a retainer groove formed in the bore of the tubular body. A retainer is mounted in the retainer groove. An entirety of the retainer is both axially movable and radially movable relative to the retainer groove during formation of a pipe assembly with a pipe in the bore.

21 Claims, 17 Drawing Sheets

(56) References Cited

U.S. PATENT DOCUMENTS

| | | | | |
|---|---|---|---|---|
| 2,950,132 A * | 8/1960 | Kocsuta | F16L 37/088 | 285/307 |
| 3,151,891 A * | 10/1964 | Sanders | F16L 37/088 | 285/110 |
| 3,314,696 A | 4/1967 | Ferguson et al. | | |
| 3,381,983 A * | 5/1968 | Hanes | E21B 17/085 | 285/27 |
| 3,455,578 A * | 7/1969 | Hanes | E21B 17/085 | 285/18 |
| 3,574,362 A | 4/1971 | Divernon et al. | | |
| 3,603,619 A * | 9/1971 | Bengesser | F16L 37/0844 | 285/45 |
| 3,606,402 A | 9/1971 | Medney | | |
| 3,637,239 A * | 1/1972 | Daniel | F16L 37/088 | 285/230 |
| 3,920,270 A * | 11/1975 | Babb, Jr. | F16L 17/035 | 285/104 |
| 3,948,548 A * | 4/1976 | Voss | F16L 37/088 | 285/321 |
| 4,007,953 A * | 2/1977 | Powell | H01R 13/621 | 285/321 |
| 4,063,760 A * | 12/1977 | Moreiras | F16L 13/00 | 285/242 |
| 4,226,445 A * | 10/1980 | Kramer | F16L 37/088 | 285/321 |
| 4,603,886 A * | 8/1986 | Pallini, Jr. | F16L 37/088 | 285/18 |
| 4,804,206 A * | 2/1989 | Wood | F16L 27/0841 | 285/13 |
| 4,854,764 A * | 8/1989 | Faber | F16B 21/18 | 279/89 |
| 4,874,174 A | 10/1989 | Kojima et al. | | |
| 4,884,829 A | 12/1989 | Funk et al. | | |
| 5,098,241 A * | 3/1992 | Aldridge | A62C 37/09 | 285/321 |
| 5,226,682 A * | 7/1993 | Marrison | F16L 37/088 | 285/308 |
| 5,498,042 A | 3/1996 | Dole | | |
| 5,662,360 A | 9/1997 | Guzowski | | |
| 5,671,955 A | 9/1997 | Shumway | | |
| 5,749,603 A | 5/1998 | Mann | | |
| 5,758,909 A | 6/1998 | Dole et al. | | |
| 5,816,625 A | 10/1998 | Clarke | | |
| 5,819,376 A | 10/1998 | Kovalsky et al. | | |
| 5,864,926 A | 2/1999 | Gyongyosi et al. | | |
| 5,876,071 A * | 3/1999 | Aldridge | F16L 37/088 | 285/305 |
| 6,062,611 A | 5/2000 | Percebois et al. | | |
| 6,102,447 A * | 8/2000 | Aldridge | F16L 37/088 | 285/305 |
| 6,183,020 B1 * | 2/2001 | Luft | F16L 37/088 | 285/321 |
| 6,186,557 B1 * | 2/2001 | Funk | F16L 37/088 | 285/308 |
| 6,302,445 B1 | 10/2001 | Kugele et al. | | |
| 6,305,889 B1 * | 10/2001 | Blessing | F16B 39/34 | 411/353 |
| 6,386,596 B1 | 5/2002 | Olson | | |
| 6,438,801 B1 | 8/2002 | Yamada | | |
| 6,473,943 B1 | 11/2002 | Thacker | | |
| 6,530,604 B1 * | 3/2003 | Luft | F16L 37/088 | 285/190 |
| 7,243,954 B2 * | 7/2007 | Toshima | F16L 21/08 | 285/231 |
| 7,284,310 B2 | 10/2007 | Jones | | |
| 7,537,248 B2 | 5/2009 | Jones | | |
| 8,127,406 B2 | 3/2012 | Morita | | |
| 8,157,296 B2 * | 4/2012 | Ullrich | F16L 37/098 | 285/305 |
| 8,267,435 B2 * | 9/2012 | Hellfeier | F02M 35/10137 | 285/307 |
| 2002/0185864 A1 * | 12/2002 | LeMay | F16L 37/088 | 285/39 |
| 2003/0001386 A1 * | 1/2003 | Cresswell | F16L 37/088 | 285/305 |
| 2003/0057699 A1 * | 3/2003 | Persohn | B60T 17/04 | 285/39 |
| 2003/0168854 A1 * | 9/2003 | Lebreton | F16L 37/088 | 285/305 |
| 2004/0056484 A1 * | 3/2004 | Kwon | F16L 13/141 | 285/321 |
| 2004/0070197 A1 * | 4/2004 | Densel | F16L 37/0842 | 285/39 |
| 2007/0152444 A1 | 7/2007 | Kertesz et al. | | |
| 2007/0176421 A1 * | 8/2007 | Meier | F16L 37/088 | 285/321 |
| 2007/0246936 A1 | 10/2007 | Jeltsch | | |
| 2010/0001515 A1 | 1/2010 | Suzuki | | |
| 2010/0019490 A1 * | 1/2010 | Udo | F16L 33/2073 | 285/332.2 |
| 2011/0278835 A1 | 11/2011 | Kishi et al. | | |
| 2012/0038149 A1 * | 2/2012 | Lee | F16L 37/088 | 285/305 |
| 2014/0191504 A1 | 7/2014 | Wu | | |
| 2015/0084329 A1 | 3/2015 | Freudendahl | | |
| 2017/0146168 A1 * | 5/2017 | Caprio | B60T 17/04 | |
| 2018/0135787 A1 * | 5/2018 | Badhorn | F16L 27/0812 | |

\* cited by examiner

SYSTEM FOR CONDUIT SQUEEZE RETAINER

This application claims priority to and the benefit of U.S. Prov. App. No. 62/453,901, filed Feb. 2, 2017, and U.S. Prov. App. No. 62/459,040, filed Feb. 14, 2017, and U.S. Prov. App. No. 62/560,045, filed Sep. 18, 2017, each of which is incorporated herein by reference in its entirety.

BACKGROUND OF THE INVENTION

Field of the Disclosure

The present invention relates in general to pipes and, in particular, to a system, method and apparatus for a conduit squeeze retainer.

Description of the Prior Art

Conventional spline-type, restrained pipe joint systems typically have splines that are separate from the pipes. The splines can be lost during transportation or disassembly. Examples of such designs include U.S. Pat. Nos. 5,662,360, 7,284,310, and 7,537,248. There are no "push to lock" type pipe joints that rely on a spline that automatically "expands" to open, and then snaps into place. Some users would prefer a quicker installation of restrained joint pipe that does not require "reversibility" (i.e., the ability to take the joint apart after assembly), and yet still provide a robust pipe joint system. Thus, improvements in pipe restrained joints continue to be of interest.

SUMMARY

Embodiments of a system, method, assembly and apparatus for a conduit squeeze retainer are disclosed. For example, an assembly can include a tubular body having an axis, a bore that is axial and a retainer groove formed in the bore of the tubular body. A retainer can be mounted in the retainer groove. An entirety of the retainer can be configured to be both axially movable and radially movable relative to the retainer groove during formation of a pipe assembly with a pipe in the bore.

In another embodiment, a pipe assembly can include a tubular body having an axis, an axial end, a bore that is axial, a retainer groove formed in the bore of the tubular body, and the retainer groove includes a plurality of radial depths relative to the axis. A retainer can be mounted in the retainer groove and be radially movable relative to the retainer groove. A pipe can be mounted in the bore of the tubular body and retained by the retainer.

Embodiments of a method of forming a pipe assembly can include providing a tubular body with an axis, a bore that is axial, and a retainer groove formed in the bore; mounting a retainer at a first radial depth in the retainer groove; inserting a pipe into the bore of the tubular body and through the retainer until a pipe retainer groove axially aligns with the retainer groove in the tubular body, such that the retainer seats in the pipe retainer groove; and then axially removing at least a portion of the pipe from the tubular body such that the retainer moves axially to a second radial depth of the retainer groove that is radially shallower than the first radial depth to form the pipe assembly.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Embodiments of a system, method, assembly and apparatus for a conduit squeeze retainer are disclosed. For example, FIGS. 1-4 depict one version of an assembly that includes a tubular body 21 having an axis 23, a bore 25 that is axial and a retainer groove 27 formed in the bore 25 of the tubular body 21. In a generic sense, the tubular body 21 can comprise a female receptacle on a component. For example, the component can be one of a pipe, a belled pipe, coupling, elbow, tee, sled tee, fitting, flange, cap, hose, flexible hose or electrical housing. In the illustrated embodiment, the tubular body 21 comprises a coupling, such as the tee coupling shown in FIGS. 1-4. In other embodiments, the tubular body 21 can comprise a pipe (not shown) that has a spigot at one axial end and bell at an opposite axial end to receive the spigot of another pipe.

Figure 1:
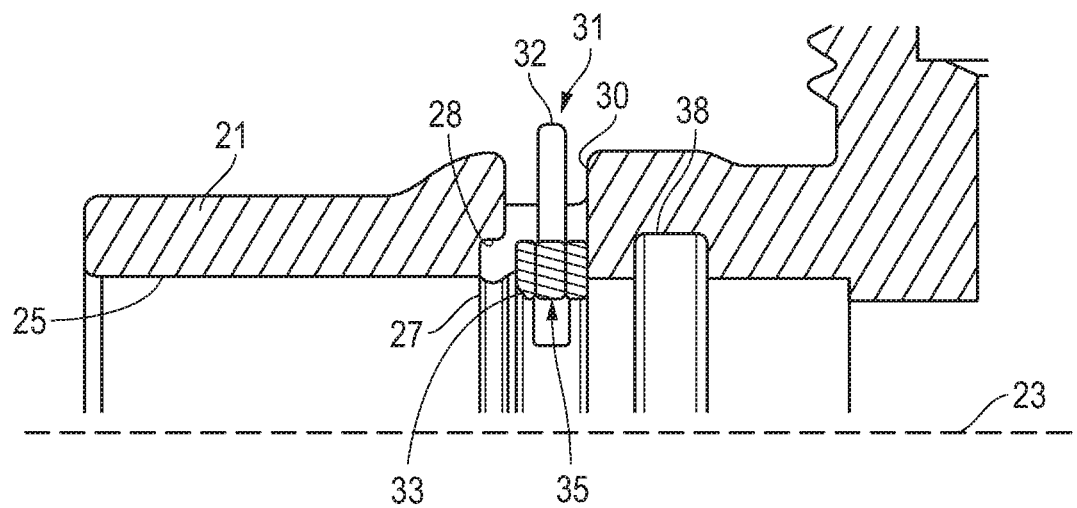
FIG. 1 is a top, half-sectional side view of an embodiment of an assembly with a retainer in an unlocked position.
Figure 2:
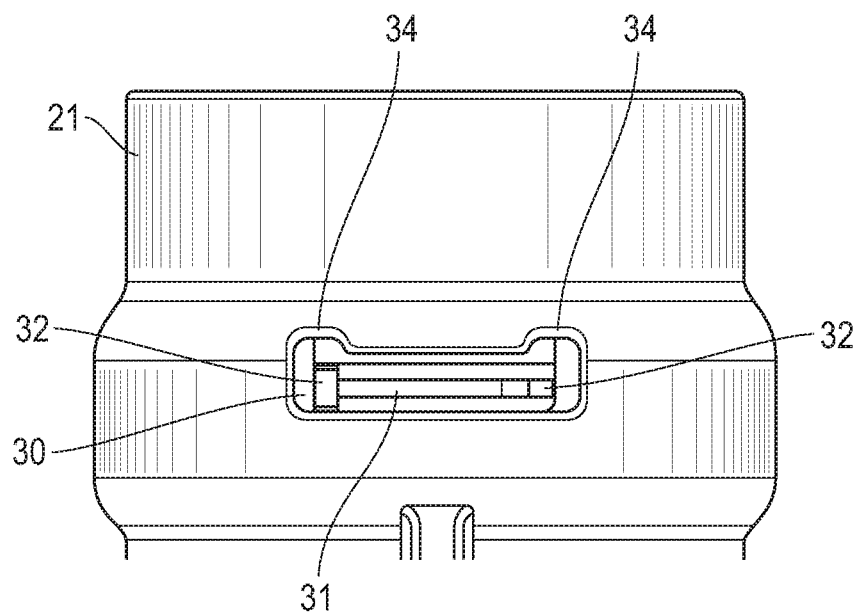
FIG. 2 is a top view of an embodiment of the assembly of FIG. 1.
Figure 3:
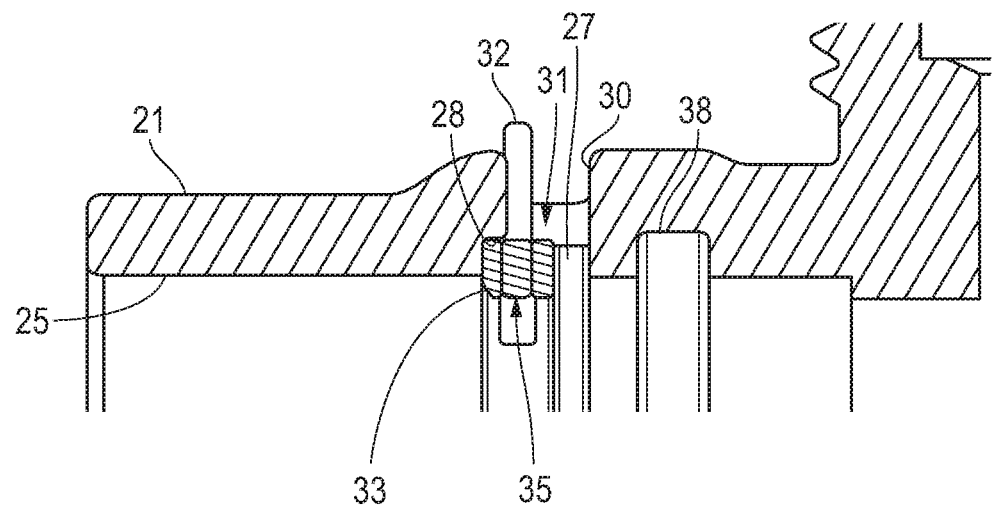
FIG. 3 is a top, half-sectional side view of the embodiment of FIG. 1 with the retainer in a locked position.
Figure 4:
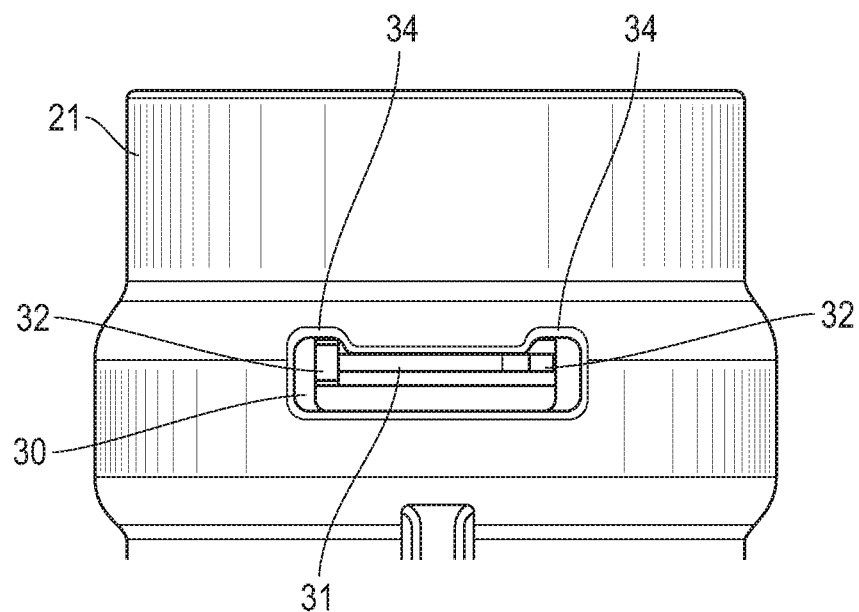
FIG. 4 is a top view of an embodiment of the assembly of FIG. 3.
Figure 5:
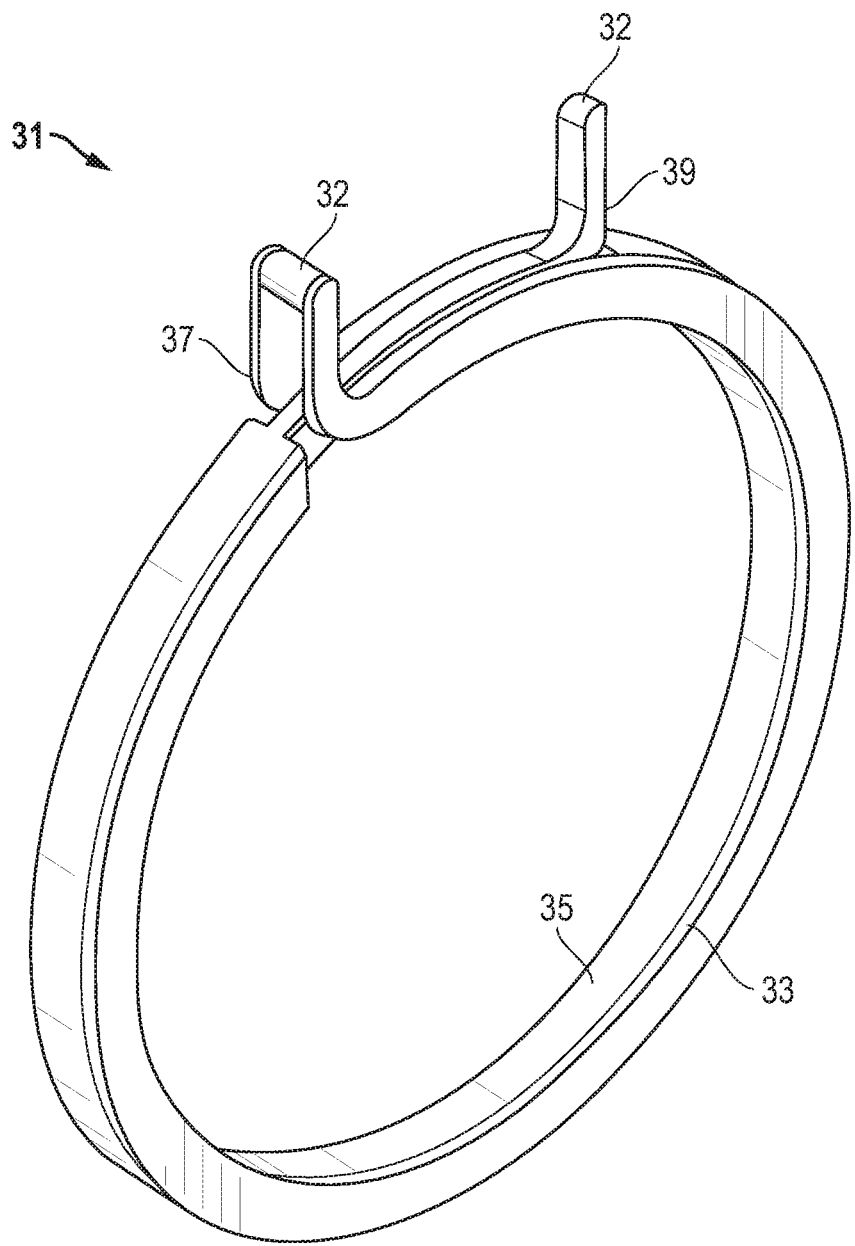
FIG. 5 is an isometric view of an embodiment of a retainer.
Figure 6:
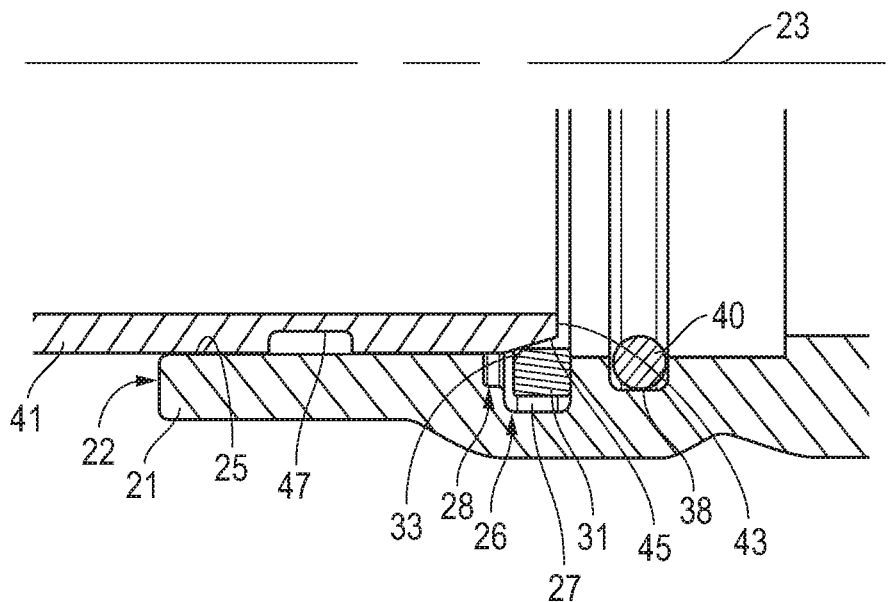
FIG. 6 is a bottom, half-sectional side view of an embodiment of a pipe system at an initial stage of contact between a pipe and a retainer in a coupling.

A retainer 31 (FIGS. 1-5) can be mounted in the retainer groove 27. In one version, the retainer 31 can comprise a spring clamp. In another version, the retainer 31 can include a radial sectional shape that is generally rectangular and has a chamfer 33 to facilitate insertion of a pipe 41 (FIG. 6) through the retainer 31. Embodiments of the retainer 31 can include a radial inner surface 35 having the chamfer 33 on an inner radial corner thereof configured to face in an axial direction of the pipe 41. Thus, retainer 31 can be uni-directional since there can be only one chamfer 33 facing in an axial direction. In other versions, the retainer 31 can be bi-directional. As shown in FIG. 5, the retainer 31 can comprise a split ring with circumferentially overlapping ends 37, 39.

In some versions, an entirety of the retainer 31 can be configured to be both axially movable (compare FIGS. 1 and 3) and radially movable (compare FIGS. 6 and 7) relative to the retainer groove 27 during formation of a pipe assembly with a pipe 41 in the bore 25. In one example, the retainer 31 can comprise a clamp having a relaxed state (FIGS. 1, 3 and 6) at a first diameter, and a radially expanded state (FIGS. 7 and 8) with a second diameter that is greater than the first diameter.

Embodiments of the retainer 31 can be configured to comprise a sequence of configurations. For example, retainer 31 can comprise a nominal configuration (FIGS. 1 and 2) having a nominal diameter relative to the axis 23 prior to formation of the pipe assembly with the pipe 41. In addition, the retainer 31 can have an expanded configuration (FIGS. 7 and 8) having an expanded diameter relative to the axis 23 during formation of the pipe assembly.

After formation of the pipe assembly, retainer 31 can have an engaged configuration (FIGS. 9 and 10) having an engaged diameter. In one example, the nominal diameter<the engaged diameter<the expanded diameter. Alternatively, the retainer 31 can be configured to comprise another nominal configuration having the nominal diameter after formation of the pipe assembly, such that it does have a separate engaged configuration at an engaged diameter. In another example, and in response to tension being applied to the pipe assembly, the retainer 31 can be configured to engage in the retainer groove 27 at a shallowest radial depth 28 (see, e.g., FIGS. 3, 4, 11 and 12) thereof. Such a configuration can mitigate spline roll.

In one example, the retainer 31 automatically engages the pipe 41 and self-assembles and locks it without directly manually engaging the retainer 31 when the pipe 41 is inserted into the bore 25 of the tubular body 21. The pipe 41 can be inserted into the tubular body 21 either manually or with machine assistance. In addition, the pipe assembly can be reversible, such that manual actuation of the retainer 31 can enable release of the pipe 41 from the tubular body 21. Moreover, the pipe assembly can be repeatably reversible such that the tubular body 21, retainer 31 and pipe 41 can repeatably form and un-form the pipe assembly.

Figure 13:
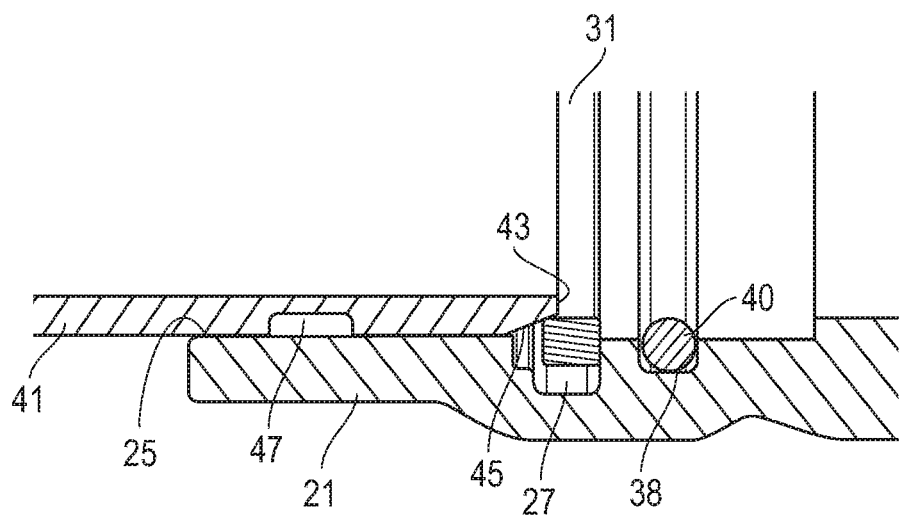
FIG. 13 is bottom, half-sectional side view of another embodiment of a pipe system.
Figure 14:
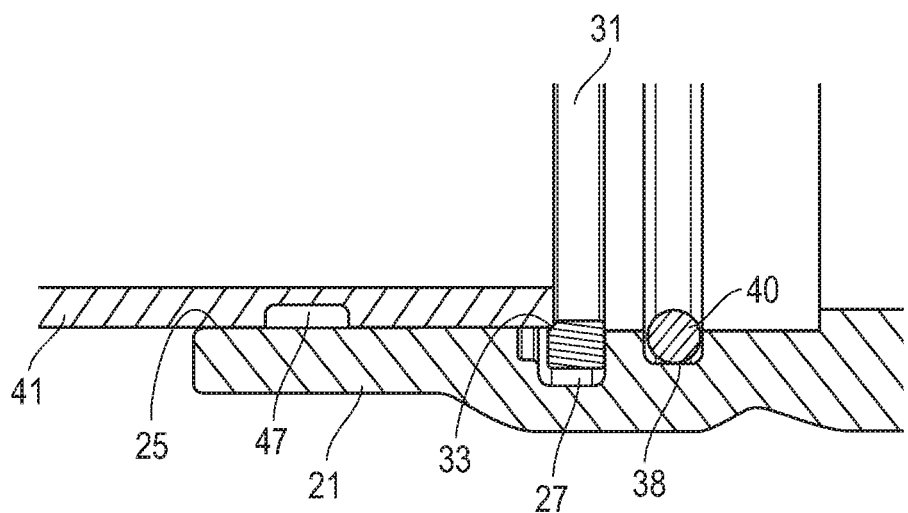
FIG. 14 is bottom, half-sectional side view of still another embodiment of a pipe system.

Embodiments of the pipe 41 can include an axial end 43 having a chamfer 45 (FIGS. 6 and 7) and a pipe retainer groove 47. The chamfer 45 can be on an exterior thereof to facilitate insertion through the retainer 31. In one version (FIG. 13), only the pipe 41 is chamfered and the retainer 31 is not chamfered. In another version (FIG. 14), only the retainer 31 is chamfered and the pipe 41 is not chamfered. However, in some of the illustrated embodiments both the retainer 31 and the pipe 41 are chamfered.

In some versions, the retainer 31 consists of only one retainer. The only one retainer can be the only retainer that is configured to retain the pipe 41 to the tubular body 21. In other versions, the retainer 31 can comprise a plurality of retainers, each mounted in a respective retainer groove 27 in the tubular body.

Figure 11:
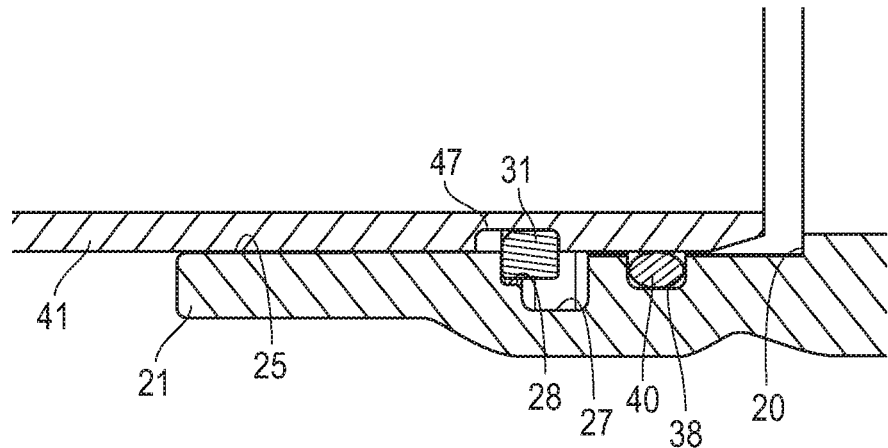
FIG. 11 is a bottom, half-sectional side view of the embodiment of the pipe system of FIG. 6 at a final stage of contact between the pipe, retainer and coupling.
Figure 12:
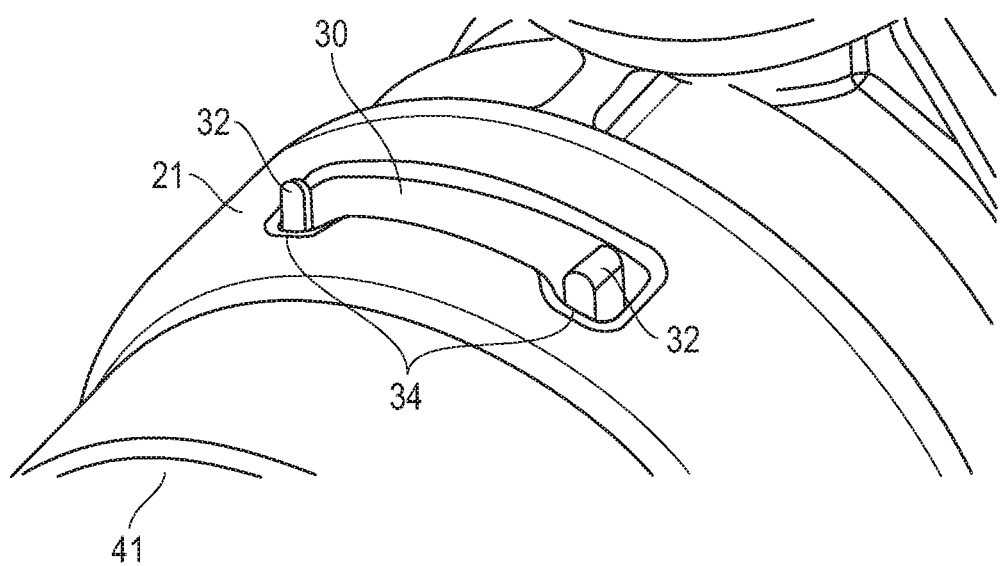
FIG. 12 is a partial, top isometric view of the pipe system of FIG. 11.

Embodiments of the retainer 31 can include radial extensions 32 relative to the axis 23. The radially extensions 32 can be configured to be manipulated (e.g., manually or with a tool) to change a dimension of the retainer 31. The radial extensions 32 can extend to an exterior of the pipe assembly. For example, the radial extensions 32 can extend through an aperture 30 in a wall of the tubular body 21. In this sense, the assembly can include visual indicia (e.g., the radial extensions 32) to indicate (a) if the retainer 31 has not engaged the pipe 41 (FIGS. 1, 2 and 6), (b) if the retainer 31 is not seated in the pipe retainer groove 47 (FIGS. 7 and 8), and/or (c) if the tubular body 21 and the pipe 41 are in tension (FIGS. 11 and 12). In one example, the radial extensions 32 can only slidingly engage each other and do not lock together.

Some versions of the aperture 30 comprise recesses 34. In an example, the radial extensions 32 can be configured to have an unrestrained position (FIGS. 1, 2, 8 and 10) in the aperture 30 where the radial extensions are not in the recesses 34. In other versions, the radial extensions 32 can be configured to have a restrained position (FIGS. 3, 4, 11 and 12) in the recesses 34. The radial extensions 32 and the retainer 31 can be axially movable between the unrestrained and restrained positions. In an embodiment, in the unrestrained position the radial extensions 32 are circumferentially movable (e.g., compare FIGS. 6-8) relative to each other, and the retainer is radially movable. In another embodiment, in the restrained position the radial extensions 32 are not circumferentially movable relative to each other, and the retainer 31 is not radially movable. The radial extensions 32 can extend out of the bore 25 and aperture 30 of the tubular body 21, such that one or more portions of the retainer 31 is exposed from an exterior of the tubular body 21. The radial extensions 32 can extend radially beyond an exterior surface of the tubular body 21.

Figure 9:
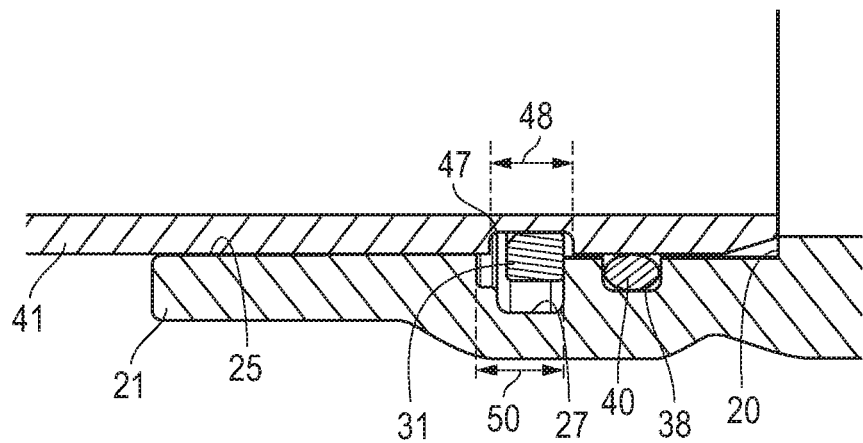
FIG. 9 is a bottom, half-sectional side view of the embodiment of the pipe system of FIG. 6 at an advanced stage of contact between the pipe, retainer and coupling.
Figure 10:
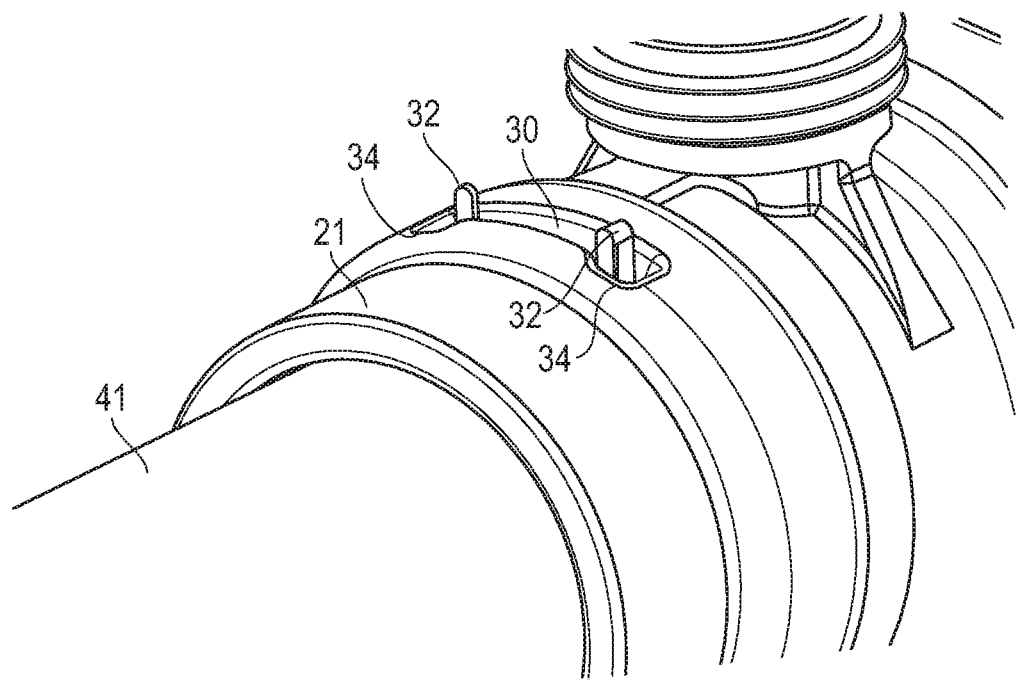
FIG. 10 is a partial, top isometric view of the pipe system of FIG. 9.
Figure 15:
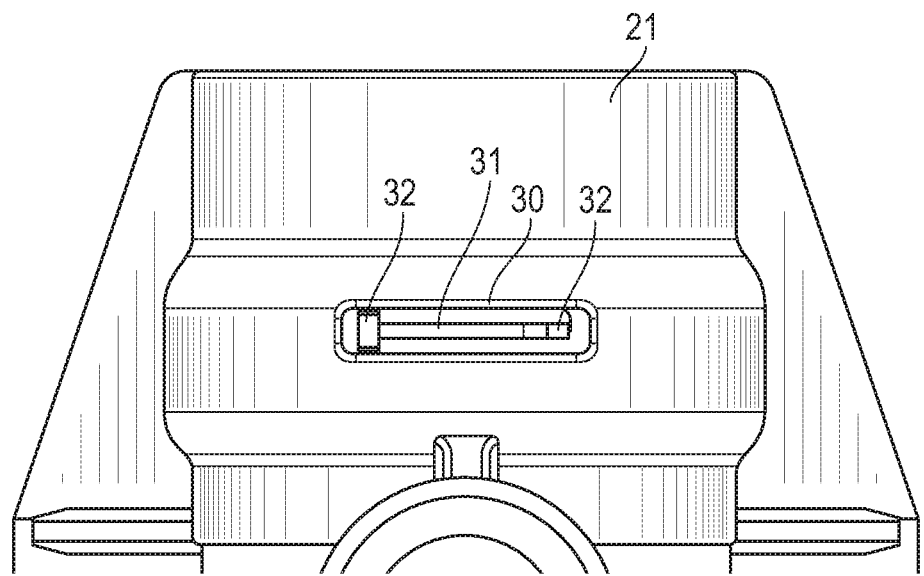
FIG. 15 is a top view of yet another embodiment of a pipe system.
Figure 16:
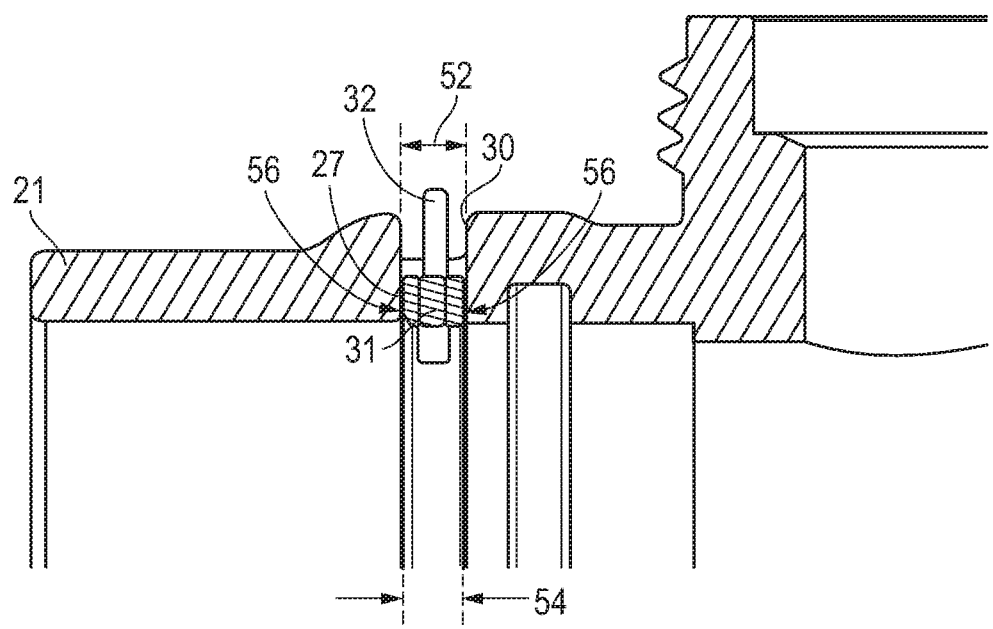
FIG. 16 is a top, half-sectional side view of the embodiment of FIG. 15.

Embodiments can include all surfaces of the retainer 31 to be smooth and not textured or grooved, such as with teeth. In another embodiment, all surfaces of the retainer groove 27 and the pipe retainer groove 47 of the pipe 41 are smooth and are not textured, such as with teeth. As shown in FIGS. 9 and 11, the pipe retainer groove 47 can be configured to receive a portion of the retainer 31. In the illustrated version, the pipe retainer groove 47 is on an exterior of the pipe 41, and the retainer groove 27 has an axial length 50 (FIG. 9) that is greater than an axial length 48 of the pipe retainer groove 47. In examples, the pipe retainer groove axial length 48 is less than the retainer groove axial length 50 by at least about 10% and not greater than about 50%. In another example, the axial length 48 of the pipe retainer groove 47 is greater than the axial length 50 of the retainer groove 27. In still another version (FIGS. 15 and 16), the retainer groove 27 has a retainer groove axial length 52, and the retainer 31 has a retainer axial length 54 that is substantially similar to (e.g., slightly less than) the axial length 52 of the retainer groove 27.

Embodiments of the retainer groove 27 can include a plurality of radial depths relative to the axis 23. In an example, the retainer groove 27 can be located adjacent an axial end 22 (FIG. 6) of the tubular body 21. The retainer groove 27 can include a deepest radial depth 26 located farthest from the axial end 22, a shallowest radial depth 28 located axially between the axial end 22 and the deepest radial depth 26. In addition, the deepest radial depth 26 can be greater than the shallowest radial depth 28.

Figure 7:
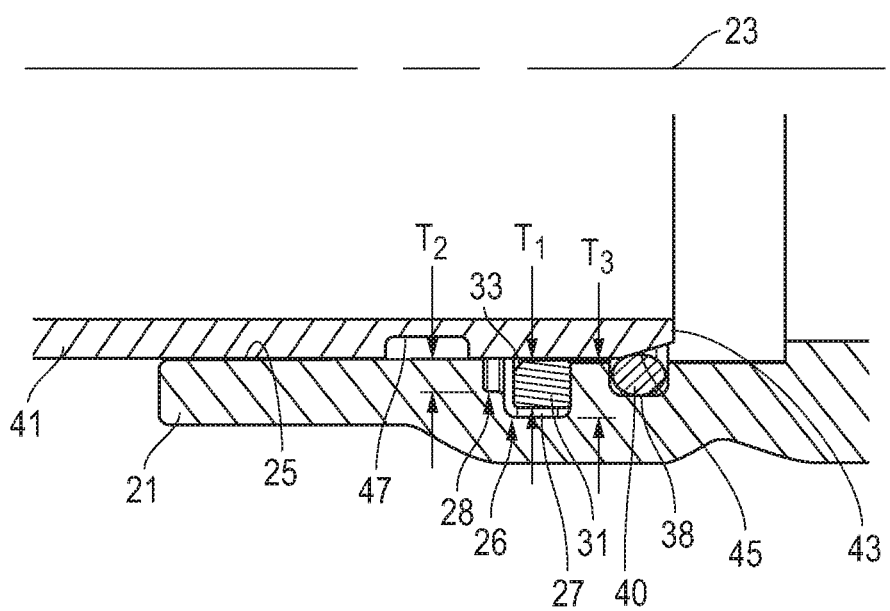
FIG. 7 is a bottom, half-sectional side view of the embodiment of the pipe system of FIG. 6 at an intermediate stage of contact between the pipe, retainer and coupling.
Figure 8:
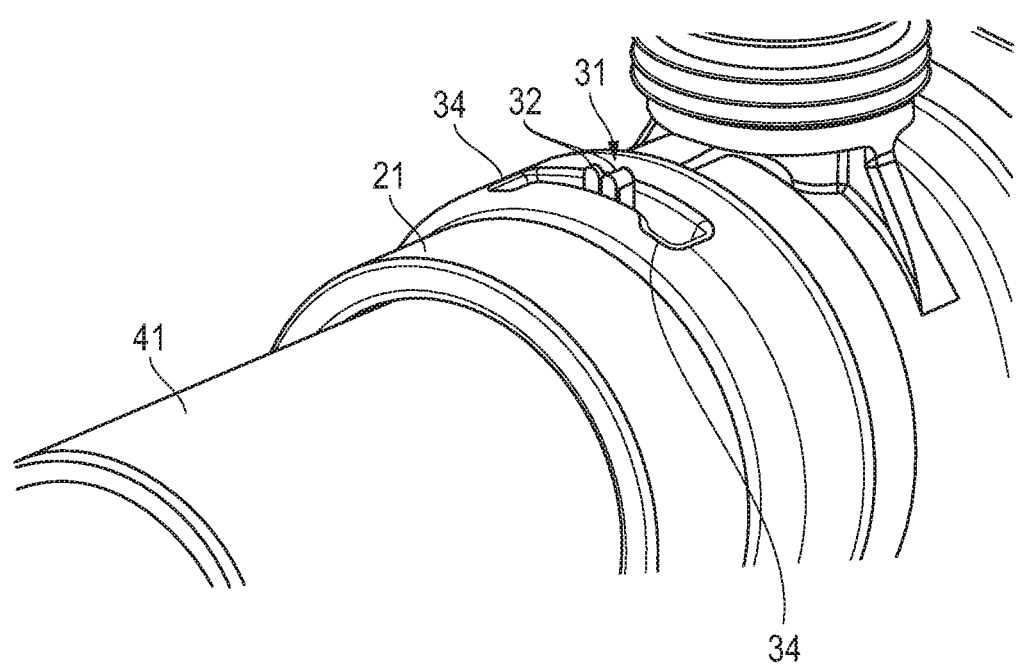
FIG. 8 is a partial, top isometric view of the pipe system of FIG. 7.

In FIG. 7, a version of the retainer 31 can have a radial thickness $T_1$ that is greater than the radial thickness $T_2$ of the shallowest radial depth 28 of the retainer groove 27. In addition, the retainer 31 can have an expanded state (see, also, FIG. 8) with an inner radius that is larger than the outer radius of the pipe. In addition, the radial thickness $T_1$ of the retainer 31 can be smaller than, or smaller than or equal to, the radial thickness $T_3$ of the deepest radial depth 26 of the retainer groove 27.

In other embodiments, the tubular body 21 can include a stop 20 (FIGS. 9 and 11) protruding radially inward from the bore 25. In an example, the bore 25 can be smooth and comprise no texture or teeth. In another version, the bore 25 can consist of a single diameter, other than the retainer groove 27 and a seal groove 38 having a seal 40 configured to seal (compare FIGS. 6-14) the tubular body 21 to the pipe 41, such as for liquid flow applications. In other examples, the assembly does not comprise a hydraulic seal.

Embodiments of a method of forming a pipe assembly also are disclosed. For example, the method can include providing a tubular body 21 with an axis 23, a bore 25 that is axial, and a retainer groove 27 formed in the bore 25. The method can include mounting a retainer 31 at a first radial depth (see, e.g., FIGS. 6 and 7) in the retainer groove 27, and inserting a pipe 41 into the bore 25 of the tubular body 21 and through the retainer 31 (compare FIGS. 6 and 7) until a pipe retainer groove 47 axially aligns (FIG. 9) with the retainer groove 27 in the tubular body 21, such that the retainer 31 seats in the pipe retainer groove 47. The method can further comprise axially removing at least a portion of the pipe 41 (FIG. 11) from the tubular body 21 such that the retainer 31 moves axially to a second radial depth of the retainer groove 27 (that can be radially shallower than the first radial depth) to form the pipe assembly.

Another embodiment of a method of forming a pipe assembly can include inserting the pipe 41 into the bore 25 of the tubular body 21 and through the retainer 31 (compare FIGS. 6 and 7) such that the retainer 31 is automatically radially expanded by the pipe 41 without manual intervention. The method can include further inserting the pipe 41 into the bore 25 until the pipe retainer groove 47 axially aligns with the retainer groove 27 in the tubular body 21, such that the retainer 31 seats in the pipe retainer groove 47 and forms the pipe assembly, such as in the examples of FIGS. 9-12.

In versions for some applications, the retainer groove 27, retainer 31 and the pipe retainer groove 47 in the pipe 41 are parallel to each other and perpendicular to the axis 23. In addition, the retainer 31 can comprise a split ring, and outer axial-facing surfaces 56 (FIG. 16) of both ends of the retainer 31 can be parallel to each other.

Figure 17:
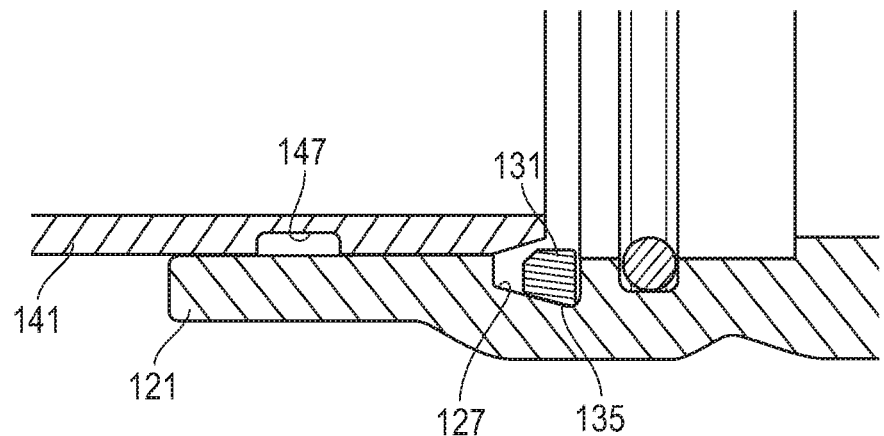
FIG. 17 is a bottom, half-sectional side view of another embodiment of a pipe system at an initial stage of contact between a pipe and a retainer in a coupling.
Figure 18:
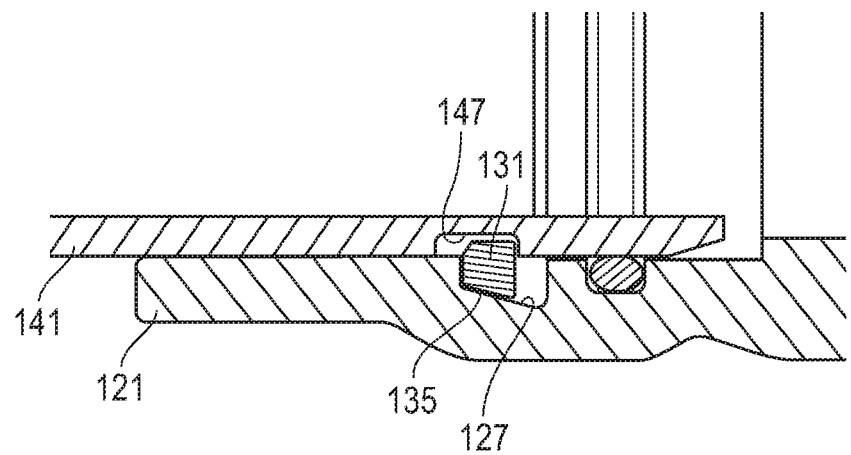
FIG. 18 is a bottom, half-sectional side view of the embodiment of the pipe system of FIG. 17 at an intermediate stage of contact between the pipe, retainer and coupling.

As shown in FIGS. 17 and 18, an embodiment of a retainer 131 can be mounted in the retainer groove 127 in an interior of the tubular body 121. Both the retainer 131 and retainer groove 127 can include sloped surfaces that are not parallel to the axis of tubular body 121. Embodiments of the retainer 131 can include a radial tapered outer surface 135 configured to slide along the tapered inner axial length of retainer groove 127. The retainer 131 can comprise a split ring as described herein for other embodiments. In some versions, an entirety of the retainer 131 can be configured to be both axially movable and radially movable relative to the retainer groove 127 during formation of a pipe assembly with a pipe 141 and tubular body 121. Thus, rather than having discrete depths as described for other embodiments, the retainer groove 127 has an angled surface that is conical in relation to the pipe axis.

Figure 19:
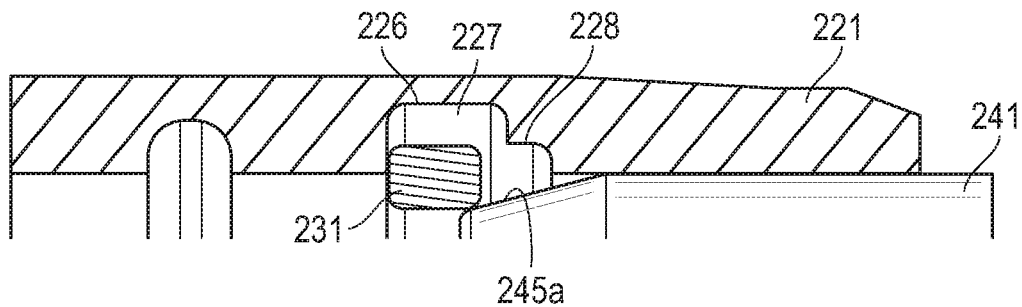
FIGS. 19-22 are top, half-sectional side views of alternate embodiments of pipe systems.
Figure 20:
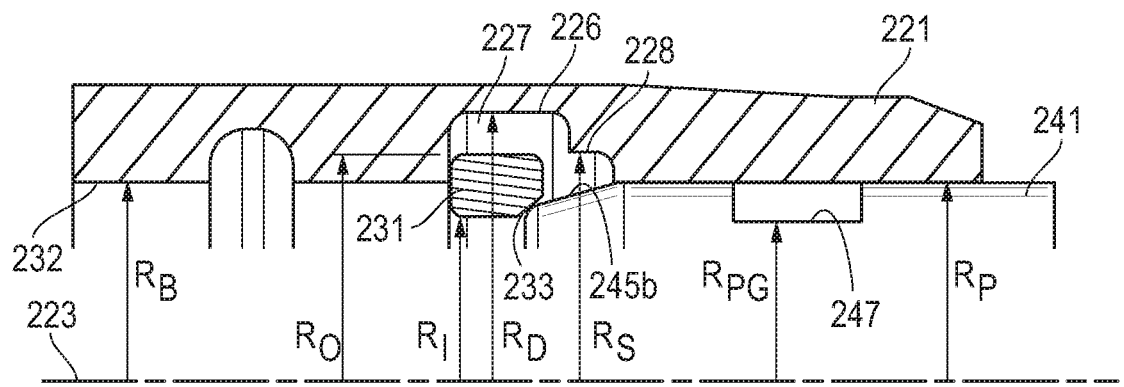

FIGS. 19-22 include top, half-sectional side views of alternate embodiments of pipe systems at initial stages of contact. For some examples, FIG. 19 depicts a pipe 241 with an elongated chamfer 245a (in some versions) adjacent its axial spigot end. Pipe 241 can be inserted into a tubular member 221 having retainer groove 227 with both a shallow radial depth 228 and a deep radial depth 226. Retainer groove 227 can receive a retainer 231 at either radial depth 226, 228. Retainer 231 can have no axial chamfer (FIG. 19), or it can include an axial chamfer 233 (FIG. 20) to facilitate entry of pipe 241, such as with a shorter chamfer 245b (FIG. 20). Retainer 231 can releasably secure pipe 241 in tubular member 221.

As shown in FIG. 20, the retainer 231 can have a relaxed, default state (i.e., an at-rest, unactuated configuration) wherein, relative to the axis 223, an inner radial dimension $R_I$ (e.g., inner radius) of the retainer 231 can be less than a radial dimension $R_P$ (e.g., outer radius) of the pipe 241. In addition, in the relaxed, default state of the retainer 231, the inner radial dimension $R_I$ (e.g., inner radius) of the retainer 231 can be less than or equal to a radial dimension $R_{PG}$ (e.g., outer radius of the pipe groove 247) of the pipe 241. In another version, the retainer 231 can have the relaxed, default state wherein an outer radius $R_O$ of the retainer 231, relative to the axis 223, can be less than an inner radius $R_G$ of the shallowest radial depth 228 of the retainer groove 227. In addition, the outer radius $R_O$ of the retainer 231 can be greater than an inner radius $R_B$ of a bore 232 of the tubular body 221.

Figure 21:
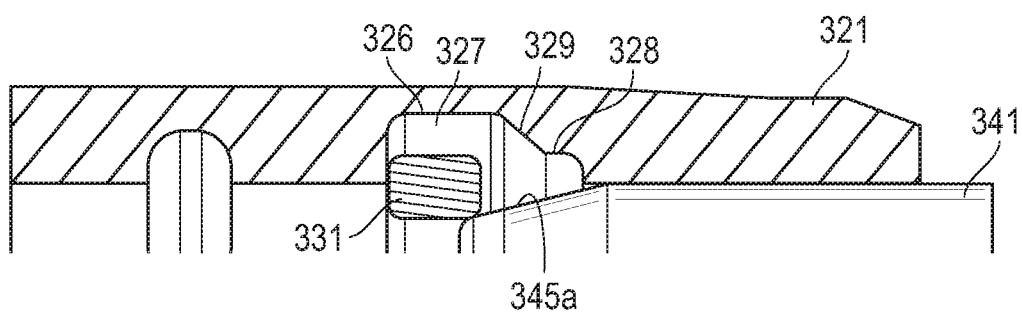
Figure 22:
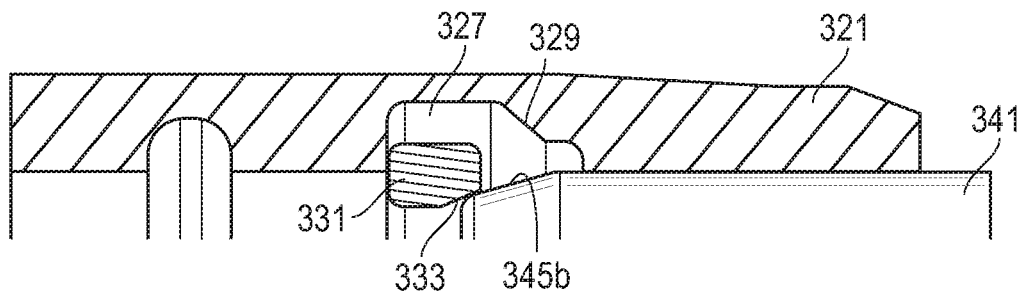

In other examples, FIG. 21 depicts a pipe 341 with an elongated chamfer 345a adjacent its axial spigot end. Pipe 341 can be inserted into a tubular member 321 having retainer groove 327 with a shallow radial depth 328, a deep radial depth 326 and an incline, diagonal or slope 329 (relative to the axis) to facilitate motion therebetween. Retainer groove 327 can receive and retain a retainer 331 at either radial depth 326, 328. Retainer 331 can have no axial chamfer (FIG. 21), or it can include an axial chamfer 333 (FIG. 22) to facilitate entry of pipe 341, such as with a shorter chamfer 345b (FIG. 22). Retainer 331 can releasably secure pipe 341 in tubular member 321.

Figure 23:
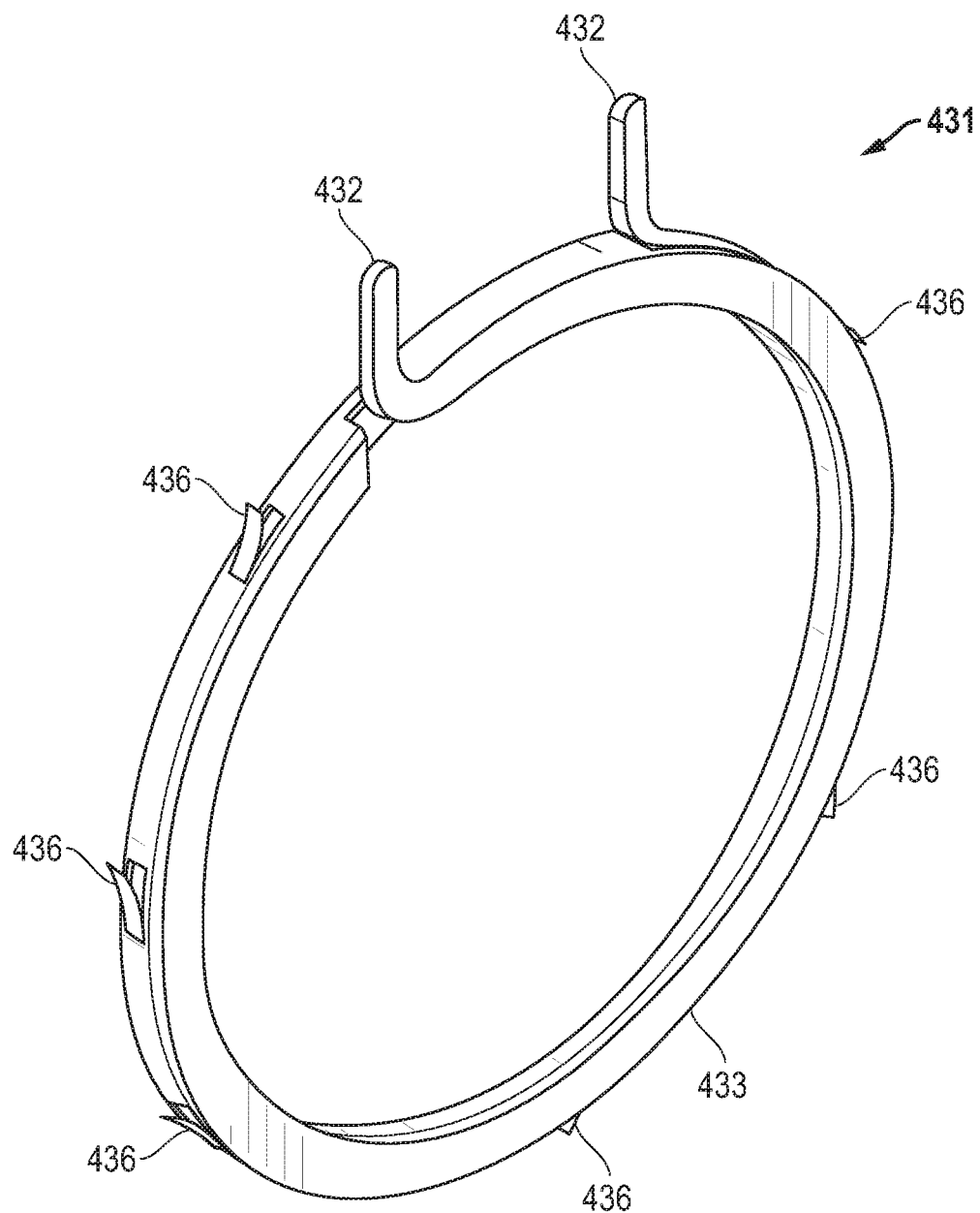
FIG. 23 is a top isometric view of an alternate embodiment of a retainer.
Figure 24:
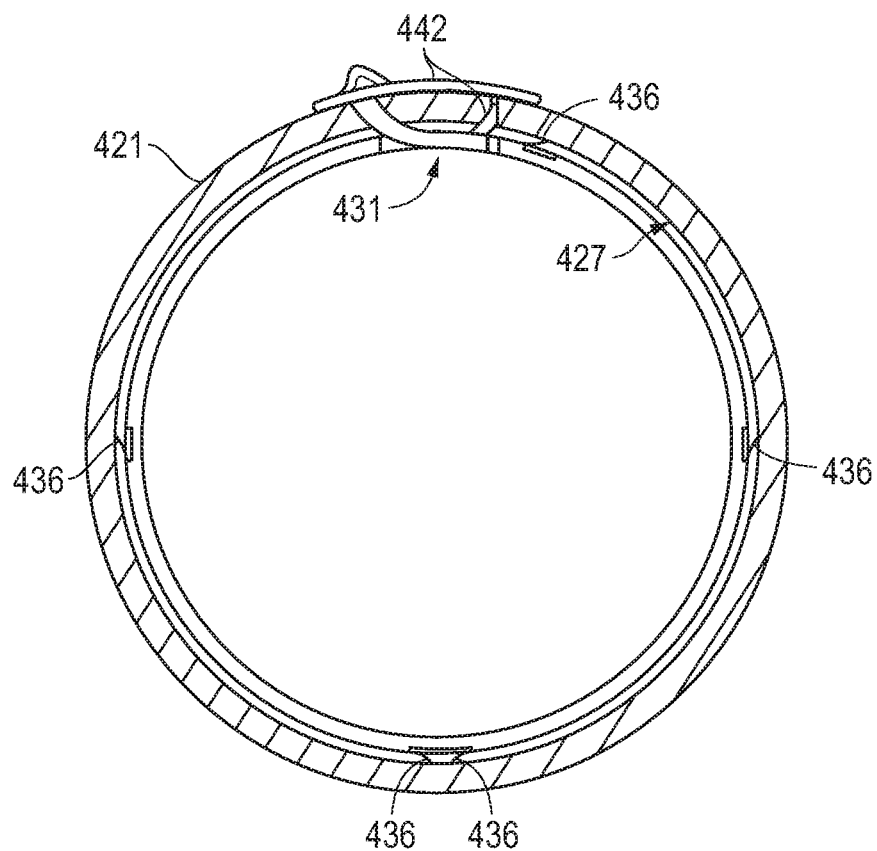
FIG. 24 is a partially-sectioned, axial end view of another alternate embodiment of an assembly of a retainer in a tubular member.
Figure 25:
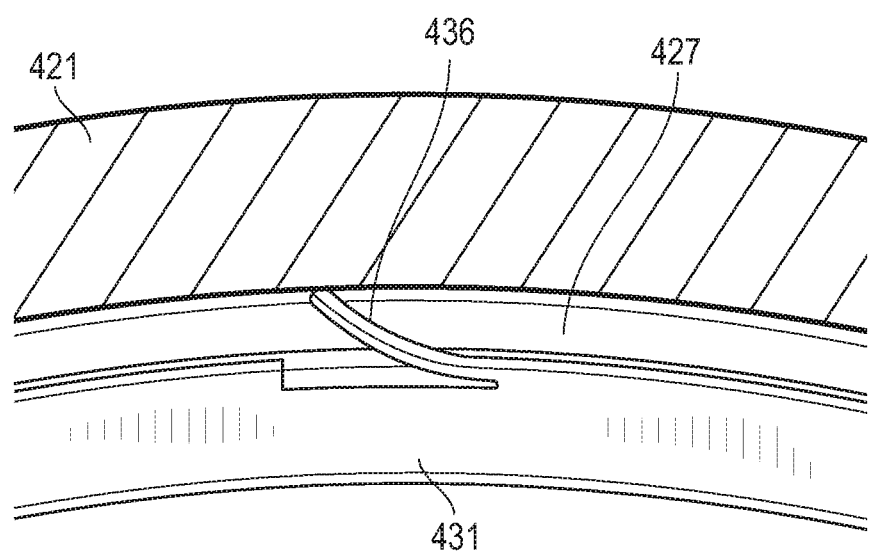
FIG. 25 is an enlarged image of a portion of the assembly of FIG. 24.

FIG. 23 depicts an alternate embodiment of a retainer 431. Like retainer 31 described herein, retainer 431 can include radial extensions 432 that can manipulate a diameter of the retainer 431. In some examples, retainer 431 can include a chamfer 433 and one or more centralizers 436. As shown in FIGS. 24 and 25, the centralizers 436 can help keep the retainer 431 centralized in the retainer groove 427 of a tubular member 421. Note that retainer 431 can include alternate versions of radial extensions 442, such as the dust covers or debris shields disclosed in U.S. Prov. App. No. 62/560,045, filed Sep. 18, 2017, which again is incorporated herein by reference in its entirety.

Figure 26:
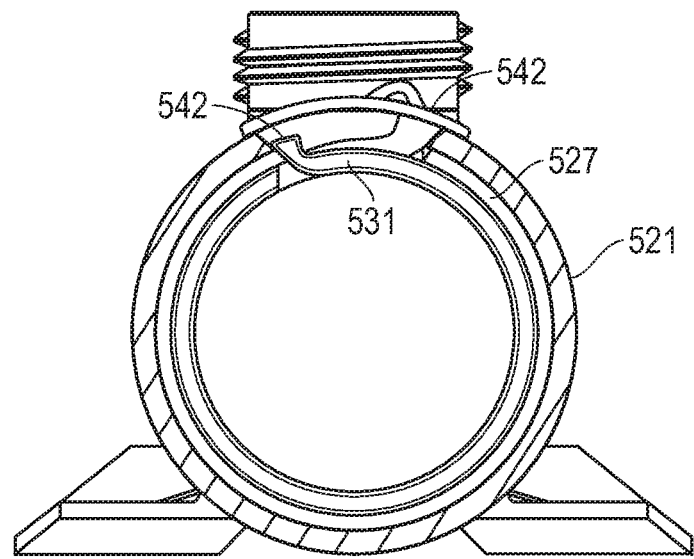
FIGS. 26 and 27 are partially-sectioned, axial end views of another embodiment of an assembly of a retainer in a tubular member shown in both engaged and unengaged positions, respectively.
Figure 27:
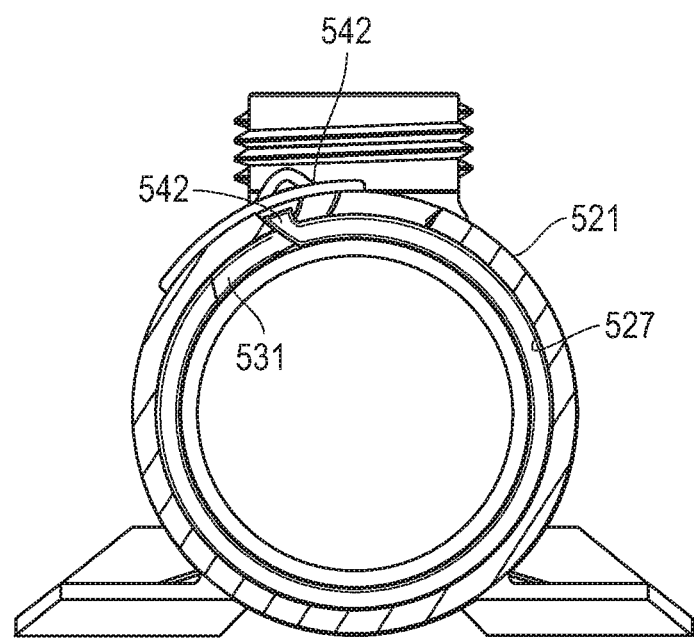

FIGS. 26 and 27 illustrate axial end views of another embodiment of an assembly of a retainer 531 in a tubular member 521. FIGS. 26 and 27 depict engaged and unengaged positions, respectively, for retainer 531 relative to retainer groove 527 in tubular member 521. In FIG. 26, a pipe (not shown) in tubular member 521 could have a pipe retainer groove engaged by retainer 531 to restrain the pipe in the tubular member 521. In FIG. 27, the pipe retainer groove of the pipe (not shown) can be released by retainer 531 to enable the pipe to be removed from the tubular member 521. At least one of the radial extensions 542 on retainer 531 can be rotated (counter-clockwise, in the version shown) to move retainer 531 from the engaged position to the unengaged position.

Figure 28:
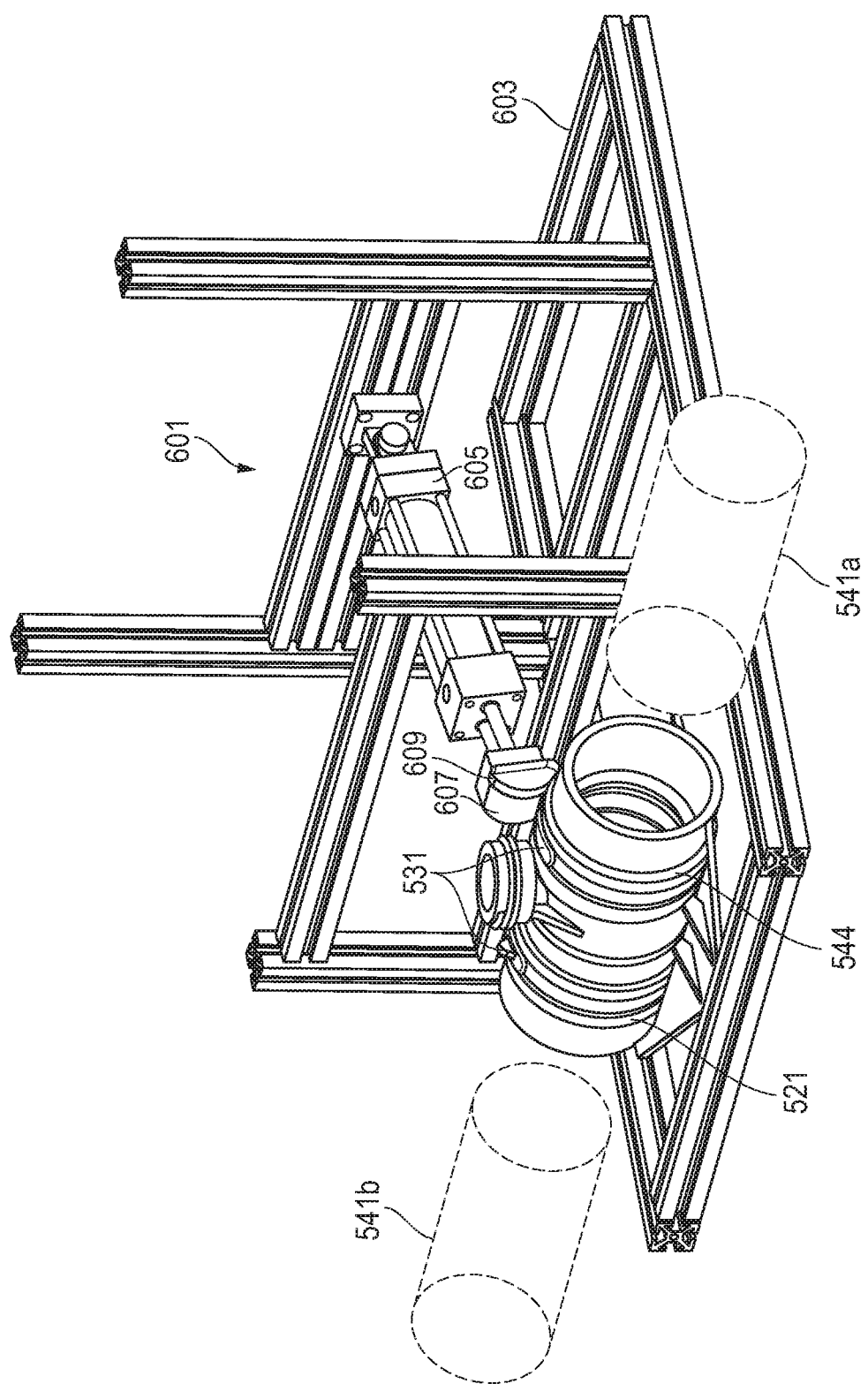
FIG. 28 is an isometric view of an embodiment of a machine for connecting or disconnecting a pipe assembly, shown at an initial stage of engagement.
Figure 29:
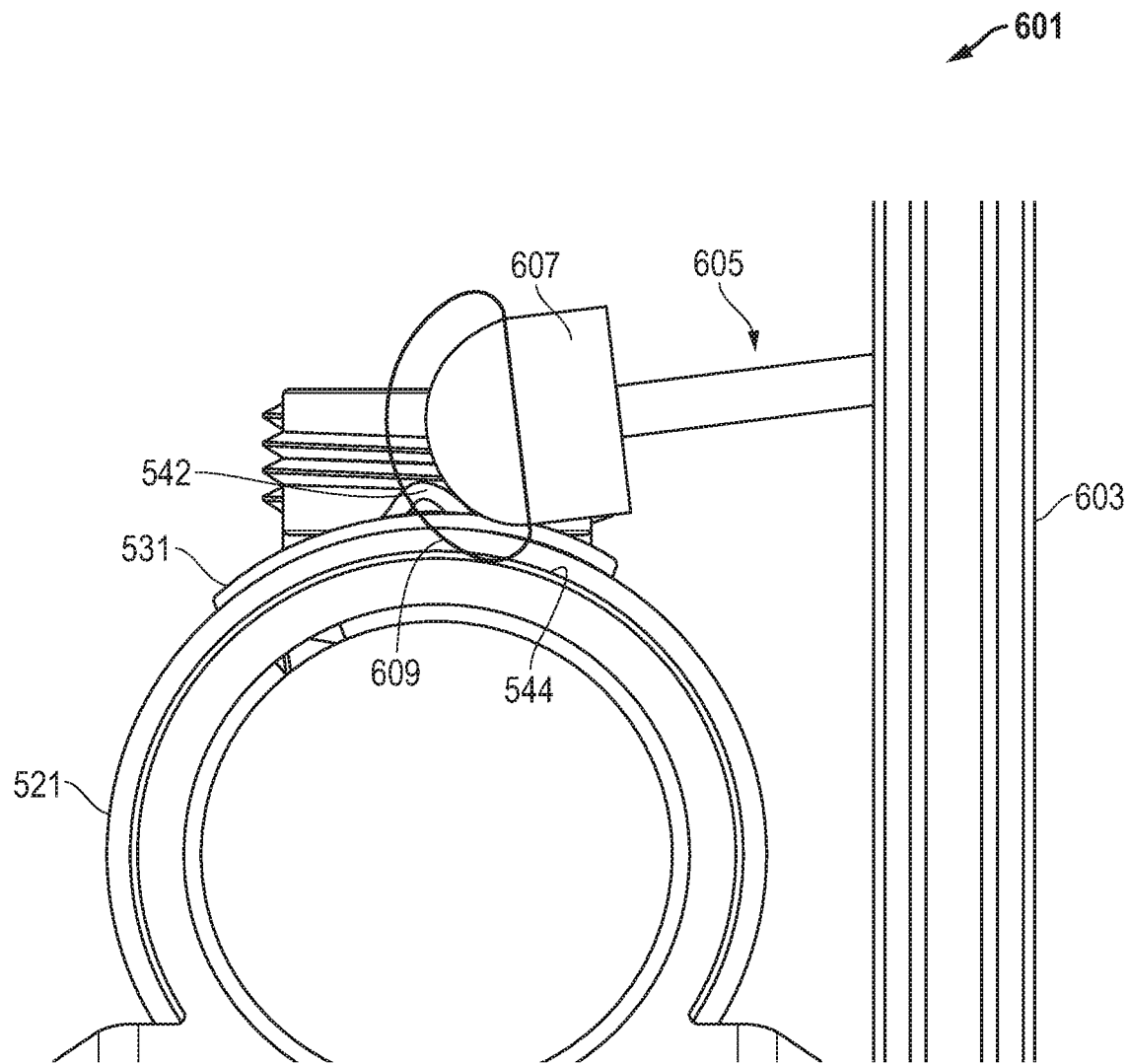
FIG. 29 is an axial end view of the machine and pipe assembly of FIG. 28, shown at an intermediate stage of engagement.

FIG. 28 depicts one version of an embodiment of a machine 601 for connecting or disconnecting a pipe assembly. In FIG. 28, the machine 601 is shown at an initial stage of engagement with the tubular member 521 having retainers 531 (e.g., two shown) for engaging pipes 541a, 541b. The machine 601 can include a frame or base 603 to which is connected an actuator 605. As shown in FIG. 29, the actuator 605 can include a piston 607 that can engage and push a portion of retainer 531 (such as at least one radial extension 542). Piston 607 can move retainer 531 from the engaged position to the unengaged position, which have been described herein. In addition, actuator 605 can include a guide 609 (e.g., a D-ring) that follows an outer recess 544 in tubular member 521 to help facilitate alignment therebetween. Piston 607 also can release the retainer 531 so that the retainer 531 returns to its natural or default engaged position. Thus, machine 601 can facilitate the assembly or disassembly of a string of pipes and tubular members that connect the pipes.

Figure 30A:
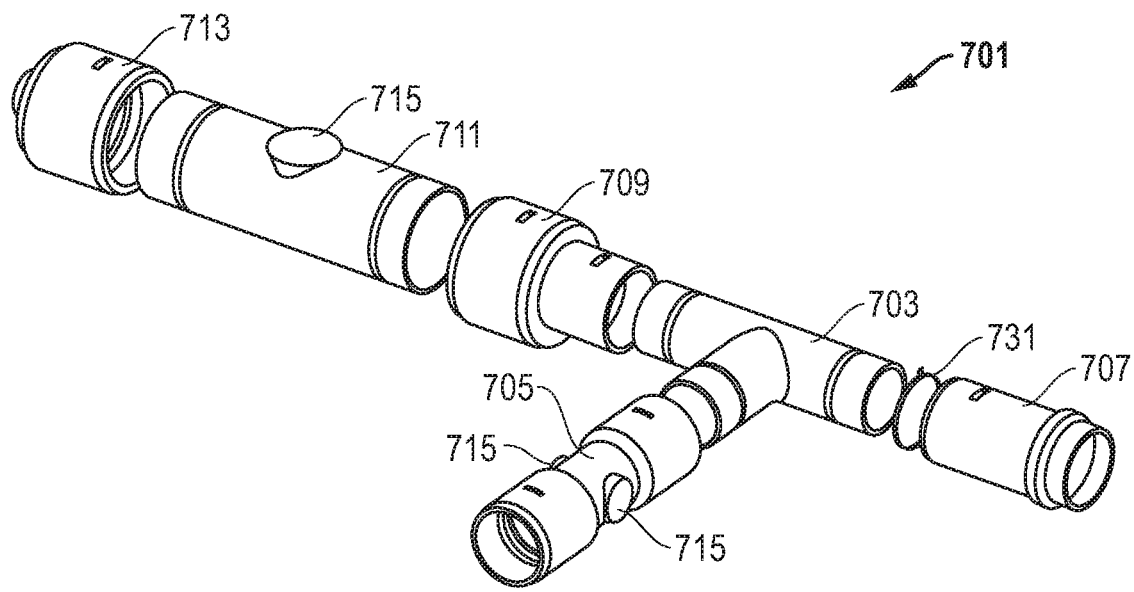
FIGS. 30A and 30B are isometric views of an alternate embodiment of a pipe assembly, shown unassembled and assembled, respectively.
Figure 30B:
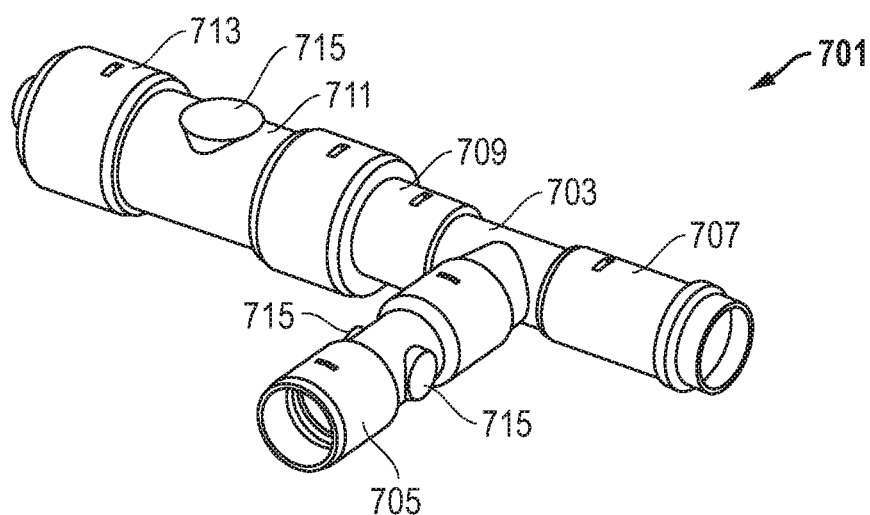

FIGS. 30A and 30B illustrate isometric views of an alternate embodiment of a pipe system 701, shown unassembled and assembled, respectively. Pipe system 701 depicts the modularity of a very adaptable pipe assembly. Pipe system 701 can include one or more of any of the components described herein, such as the retainers (e.g., retainer 31), to form releasable connections within the pipe assembly. In the version illustrated, the pipe system 701 is shown with a tee 703, different types of adapters 705, 707, 709, 711 and other accessories, such as an end cap 713. For example, adapter 705 can be a female by female capped coupling, adapter 707 can be a female restrained coupling to a female gasketed coupling, adapter 709 can be a diameter reducer or enlarger, adapter 711 can be male by male adapter. The fittings or adapters can be made to confirm to standardized connections. The pipe system 701 can include more, fewer of different components than those shown.

Pipe system 701 also can include one or more adaptive sites 715. Each adaptive site 715 can have one or more purposes. For example, a first purpose for adaptive site 715 is provided during molding and manufacturing of the component on which the adaptive site 715. During fabrication, the mold that forms the adaptive site 715 can be reconfigured with other mold inserts to change the purpose of adaptive site 715. Versions of adaptive site 715 can include a threaded hole that can be threadingly connected to another component, a conical hole provided for a spin weld to another component, etc. In some embodiments, the adaptability of adaptive site 715 can be limited to the profile size (e.g., axially, radially, etc.) of the adaptive site.

Embodiments of a second purpose for the adaptive sites 715 can include reconfiguration in the field, such as during assembly or installation of the pipe system 701. For example, when the pipe system 701 is in the process of being deployed for operational use, it can be desirable to reconfigure the adaptive site 715 for another component, rather than letting it remain sealed from use or fluid communication. In some versions, the adaptive site 715 can be tapped in the field to provide a threaded connection to another component. In another version, the adaptive site 715 can be reamed out to form a conical aperture in which another component can be spin welded.

Other versions can include one or more of the following embodiments:

Embodiment 1. An assembly, comprising:
a tubular body having an axis, a bore that is axial and a retainer groove formed in the bore of the tubular body; and
a retainer mounted in the retainer groove, and an entirety of the retainer is configured to be both axially movable and radially movable relative to the retainer groove during formation of a pipe assembly with a pipe in the bore.

Embodiment 2. The assembly of any of these embodiments, wherein the tubular body comprises a female receptacle on a component.

Embodiment 3. The assembly of any of these embodiments, wherein the component comprises one of a pipe, a belled pipe, coupling, elbow, tee, sled tee, fitting, flange, cap, hose, flexible hose and electrical housing.

Embodiment 4. The assembly of any of these embodiments, wherein the retainer automatically engages the pipe without manual intervention when the pipe is inserted into the bore of the tubular body.

Embodiment 5. The assembly of any of these embodiments, wherein the pipe assembly is reversible such that actuation of the retainer releases the pipe from the tubular body.

Embodiment 6. The assembly of any of these embodiments, wherein the pipe assembly is repeatably reversible such that the tubular body, retainer and pipe can repeatably form and un-form the pipe assembly.

Embodiment 7. The assembly of any of these embodiments, wherein the retainer comprises a spring clamp.

Embodiment 8. The assembly of any of these embodiments, wherein the retainer comprises a radial sectional shape that is rectangular and is chamfered to facilitate insertion of the pipe through the retainer.

Embodiment 9. The assembly of any of these embodiments, wherein the retainer comprises a radial inner surface having a chamfer on a corner thereof configured to face in an axial direction of the pipe.

Embodiment 10. The assembly of any of these embodiments, wherein the retainer comprises a split ring with circumferentially overlapping ends.

Embodiment 11. The assembly of any of these embodiments, wherein the pipe has an axial end that is chamfered on an exterior thereof to facilitate insertion through the retainer.

Embodiment 12. The assembly of any of these embodiments, wherein only the retainer is chamfered and the pipe is not chamfered.

Embodiment 13. The assembly of any of these embodiments, wherein only the pipe is chamfered and the retainer is not chamfered.

Embodiment 14. The assembly of any of these embodiments, wherein both the retainer and the pipe are chamfered.

Embodiment 15. The assembly of any of these embodiments, wherein the retainer comprises a clamp having a relaxed state with a first diameter, and a radially expanded state with a second diameter that is greater than the first diameter.

Embodiment 16. The assembly of any of these embodiments, wherein the assembly comprises visual indicia to indicate if the tubular body and the pipe are in tension.

Embodiment 17. The assembly of any of these embodiments, wherein, in response to tension being applied to the pipe assembly, the retainer is configured to engage in the retainer groove at a shallowest radial depth thereof.

Embodiment 18. The assembly of any of these embodiments, wherein the retainer is configured to:
radially expand when the pipe is being inserted into the tubular body; and
move axially into a shallower portion of the retainer groove when the pipe assembly is put in tension.

Embodiment 19. The assembly of any of these embodiments, wherein the retainer is configured to comprise:
a nominal configuration having a nominal diameter relative to the axis prior to formation of the pipe assembly with the pipe;
an expanded configuration having an expanded diameter relative to the axis during formation of the pipe assembly, and the expanded diameter is greater than the nominal diameter; and
an engaged configuration having an engaged diameter after formation of the pipe assembly, wherein the nominal diameter<the engaged diameter<the expanded diameter.

Embodiment 20. The assembly of any of these embodiments, wherein the retainer is configured to comprise:
a nominal configuration having a nominal diameter relative to the axis prior to formation of the pipe assembly with the pipe;
an expanded configuration having an expanded diameter relative to the axis during formation of the pipe assembly, and the expanded diameter is greater than the nominal diameter; and
another nominal configuration having the nominal diameter after formation of the pipe assembly.

Embodiment 21. The assembly of any of these embodiments, wherein the retainer consists of only one retainer. The only one retainer can be the only retainer that is configured to retain the pipe to the tubular body.

Embodiment 22. The assembly of any of these embodiments, wherein the retainer comprises a plurality of retainers, each mounted in a respective retainer groove in the tubular body.

Embodiment 23. The assembly of any of these embodiments, wherein the retainer comprises radial extensions relative to the axis, and the radially extensions are configured to be manipulated to change a dimension of the retainer.

Embodiment 24. The assembly of any of these embodiments, wherein the radial extensions are configured to only slidingly engage each other and do not lock together.

Embodiment 25. The assembly of any of these embodiments, wherein the radial extensions extend through an aperture in a wall of the tubular body.

Embodiment 26. The assembly of any of these embodiments, wherein the aperture comprises recesses, the radial extensions are configured to have an unrestrained position in the aperture, and the radial extensions are configured to have a restrained position in the recesses.

Embodiment 27. The assembly of any of these embodiments, wherein the radial extensions and the retainer are axially movable between the unrestrained and restrained positions.

Embodiment 28. The assembly of any of these embodiments, wherein, in the unrestrained position the radial extensions are circumferentially movable and the retainer is radially movable, and in the restrained position the radial extensions are not circumferentially movable and the retainer is not radially movable.

Embodiment 29. The assembly of any of these embodiments, wherein the radial extensions extend out of the bore of the tubular body such that a portion of the retainer is exposed from an exterior of the tubular body.

Embodiment 30. The assembly of any of these embodiments, wherein the radial extensions extend radially beyond an exterior surface of the tubular body.

Embodiment 31. The assembly of any of these embodiments, wherein all surfaces of the retainer are smooth and are not grooved with teeth.

Embodiment 32. The assembly of any of these embodiments, wherein all surfaces of the retainer groove and a pipe retainer groove of the pipe are smooth and are not grooved with teeth.

Embodiment 33. The assembly of any of these embodiments, wherein the retainer groove comprises a plurality of radial depths relative to the axis.

Embodiment 34. The assembly of any of these embodiments, wherein the retainer groove is located adjacent an axial end of the tubular body, the retainer groove comprises a deepest radial depth located farthest from the axial end, a shallowest radial depth located axially between the axial end and the deepest radial depth, and the deepest radial depth is greater than the shallowest radial depth.

Embodiment 35. The assembly of any of these embodiments, wherein the tubular body further comprises a stop protruding radially inward from the bore.

Embodiment 36. The assembly of any of these embodiments, wherein the bore consists of a single diameter.

Embodiment 37. The assembly of any of these embodiments, wherein the bore is smooth and comprises no teeth.

Embodiment 38. The assembly of any of these embodiments, wherein the tubular body further comprises a seal groove with a seal configured to seal the tubular body to the pipe in the pipe assembly.

Embodiment 39. The assembly of any of these embodiments, wherein the assembly does not comprise a hydraulic seal.

Embodiment 40. The assembly of any of these embodiments, wherein the pipe comprises a pipe retainer groove configured to receive the retainer.

Embodiment 41. The assembly of any of these embodiments, wherein the pipe has a pipe retainer groove on an exterior thereof for the retainer, and the retainer groove has an axial length that is greater than an axial length of the pipe retainer groove.

Embodiment 42. The assembly of any of these embodiments, wherein the pipe retainer groove axial length is less than the retainer groove axial length by at least about 10% and not greater than about 50%.

Embodiment 43. An assembly, comprising:

a tubular body having an axis, an axial end, a bore that is axial and a retainer groove formed in the bore of the tubular body; and a retainer mounted in the retainer groove, the retainer comprises a radial section shape relative to the axis that is rectangular, the retainer comprises a radial inner surface having a corner with a chamfer facing the axial end of the tubular body, and the retainer is configured to be radially movable relative to the retainer groove during formation of a pipe assembly with a pipe in the bore.

Embodiment 44. The assembly of any of these embodiments, wherein the retainer groove has a retainer groove axial length, and the retainer has a retainer axial length that is substantially similar to the retainer groove axial length.

Embodiment 45. A pipe assembly, comprising:

a tubular body having an axis, an axial end, a bore that is axial, a retainer groove formed in the bore of the tubular body, and the retainer groove comprises a plurality of radial depths relative to the axis;

a retainer mounted in the retainer groove, and the retainer is radially movable relative to the retainer groove; and a pipe mounted in the bore of the tubular body and retained by the retainer.

Embodiment 46. A pipe assembly, comprising:

a tubular body having an axis, an axial end, a bore that is axial, and a retainer groove formed in the bore of the tubular body;

a pipe mounted in the bore of the tubular body and having a pipe retainer groove on an exterior thereof, and the retainer groove of the tubular body has an axial length that is greater than an axial length of the pipe retainer groove; and a retainer mounted in the retainer groove and the pipe retainer groove for retaining the pipe in the tubular body.

Embodiment 47. A method of forming a pipe assembly, the method comprising:

(a) providing a tubular body with an axis, a bore that is axial, and a retainer groove formed in the bore;

(b) mounting a retainer at a first radial depth in the retainer groove;

(c) inserting a pipe into the bore of the tubular body and through the retainer until a pipe retainer groove axially aligns with the retainer groove in the tubular body, such that the retainer seats in the pipe retainer groove; and then (d) axially removing at least a portion of the pipe from the tubular body such that the retainer moves axially to a second radial depth of the retainer groove that is radially shallower than the first radial depth to form the pipe assembly.

Embodiment 48. A method of forming a pipe assembly, the method comprising:

(a) providing a tubular body with an axis, a bore that is axial, and a retainer groove formed in the bore;

(b) mounting a retainer at a first radial depth in the retainer groove;

(c) inserting a pipe into the bore of the tubular body and through the retainer such that the retainer is automatically radially expanded by the pipe without manual intervention; and then (d) further inserting the pipe into the bore until a pipe retainer groove axially aligns with the retainer groove in the tubular body, such that the retainer seats in the pipe retainer groove and forms the pipe assembly.

Embodiment 49. The assembly of any of these embodiments, wherein the retainer groove, retainer and a pipe retainer groove in the pipe are parallel to each other and perpendicular to the axis.

Embodiment 50. The assembly of any of these embodiments, wherein the retainer comprises a split ring, and outer axial-facing surfaces of both ends of the retainer are co-planar.

Embodiment 51. A pipe system, comprising:

a tubular body having an axis, a bore that is axial and a retainer groove formed in the bore of the tubular body, wherein the retainer groove has a shallow radius and a deep radius that is greater than the shallow radius;

a retainer configured to be mounted in the retainer groove, wherein the retainer comprises a radial thickness T1 that is greater than a radial thickness T2 of the shallow radius of the retainer groove; and the radial thickness T1 of the retainer is less than or equal to a radial thickness T3 of the deep radius of the retainer groove.

Embodiment 52. The pipe system of any of these embodiments, wherein the retainer has a relaxed, default state wherein, relative to the axis, an inner radius RI of the retainer is less than an outer radius RP of a pipe for the tubular body.

Embodiment 53. The pipe system of any of these embodiments, wherein the inner radius RI of the retainer is less than or equal to an outer radius RPG of a pipe retainer groove in an exterior of the pipe.

Embodiment 54. The pipe system of any of these embodiments, wherein the retainer has a relaxed, default state wherein, relative to the axis, an outer radius RO of the retainer is less than an inner radius RG of the shallow radius of the retainer groove, and the outer radius RO of the retainer is greater than an inner radius RB of the bore of the tubular body.

Embodiment 55. The pipe system of any of these embodiments, wherein the retainer is configured to be fully radially expanded into and seat completely within the deep radius of the retainer groove in the tubular body.

Embodiment 56. The pipe system of any of these embodiments, wherein a radial size of the retainer is configured to radially expand relative to the axis when a pipe is axially inserted through the retainer in the tubular body.

Embodiment 57. The pipe system of any of these embodiments, wherein a chamfer on the retainer or on the pipe is configured to translate axial motion of the pipe through the retainer into a radial motion of the retainer.

Embodiment 58. The pipe system of any of these embodiments, wherein the tubular body is one of a coupling or an integrated bell on an axial end of a pipe.

Embodiment 59. A pipe system, comprising:

a tubular body having an axis, a bore that is axial and a retainer groove formed in the bore of the tubular body; and a retainer configured to be mounted in the retainer groove, and an entirety of the retainer is configured to be both axially movable and radially movable relative to the retainer groove during formation of a pipe assembly with a pipe in the bore.

Embodiment 60. The pipe system of any of these embodiments, wherein the retainer is configured to automatically engage the pipe without manual intervention with the retainer when the pipe is inserted into the bore of the tubular body.

Embodiment 61. The pipe system of any of these embodiments, wherein the pipe assembly is configured to be reversible such that actuation of the retainer releases the pipe from the tubular body.

Embodiment 626. The pipe system of any of these embodiments, wherein the pipe assembly is configured to be repeatably reversible such that the tubular body, retainer and pipe can repeatably form and un-form the pipe assembly.

Embodiment 63. The pipe system of any of these embodiments, wherein the retainer comprises a radial inner surface having a chamfer on a corner thereof configured to face in an axial direction of the pipe.

Embodiment 64. The pipe system of any of these embodiments, wherein the retainer comprises a split ring with circumferentially overlapping ends.

Embodiment 65. The pipe system of any of these embodiments 4, wherein the split ring is configured to comprise a relaxed state with a first diameter, and a radially expanded state with a second diameter that is greater than the first diameter.

Embodiment 66. The pipe system of any of these embodiments, wherein tubular body comprises visual indicia configured to indicate if the tubular body and the pipe are in tension.

Embodiment 67. The pipe system of any of these embodiments, wherein, in response to tension being applied to the pipe assembly, the retainer is configured to engage in the retainer groove at a shallowest radial depth thereof.

Embodiment 68. The pipe system of any of these embodiments, wherein the retainer is configured to:

radially expand when the pipe is inserted into the tubular body; and move axially into a shallower portion of the retainer groove when the pipe assembly is put in tension.

Embodiment 69. The pipe system of any of these embodiments, wherein the retainer is configured to comprise:

a nominal configuration having a nominal diameter relative to the axis prior to formation of the pipe assembly with the pipe;

an expanded configuration having an expanded diameter relative to the axis during formation of the pipe assembly, and the expanded diameter is greater than the nominal diameter; and an engaged configuration having an engaged diameter after formation of the pipe assembly, wherein the nominal diameter<the engaged diameter<the expanded diameter.

Embodiment 70. The pipe system of any of these embodiments, wherein the retainer consists of only one retainer, and the only one retainer is the only retainer that is configured to retain the pipe to the tubular body.

Embodiment 71. The pipe system of any of these embodiments, wherein the retainer comprises radial extensions relative to the axis, and the radially extensions are configured to be manipulated to change a dimension of the retainer.

Embodiment 72. The pipe system of any of these embodiments, wherein the radial extensions are configured to only slidingly engage each other and do not lock together, and the radial extensions are configured to extend through an aperture in a wall of the tubular body; and the aperture comprises recesses, the radial extensions are configured to have an unrestrained position in the aperture, the radial extensions are configured to have a restrained position in the recesses, and the radial extensions and the retainer are configured to be axially movable between the unrestrained and restrained positions.

Embodiment 73. The pipe system of any of these embodiments, wherein, in the unrestrained position the radial extensions are configured to be circumferentially movable and the retainer is radially movable, and in the restrained position the radial extensions are configured to be not circumferentially movable and the retainer is not radially movable.

Embodiment 74. A pipe system, comprising:

a tubular body having an axis, an axial end, a bore that is axial, a retainer groove formed in the bore of the tubular body, and the retainer groove comprises a plurality of radial depths relative to the axis;

a retainer configured to be mounted in the retainer groove, and the retainer is configured to be radially movable relative to the retainer groove; and a pipe is configured to be mounted in the bore of the tubular body and retained by the retainer.

Embodiment 75. A pipe system, comprising:

a tubular body having an axis, an axial end, a bore that is axial, and a retainer groove formed in the bore of the tubular body;

a pipe configured to be mounted in the bore of the tubular body and having a pipe retainer groove on an exterior thereof, and the retainer groove of the tubular body has an axial length that is greater than an axial length of the pipe retainer groove; and a retainer configured to be mounted in the retainer groove and the pipe retainer groove for retaining the pipe in the tubular body.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A pipe system, comprising:
   a tubular body having an axis, a bore that is axial, a bore inner surface, and a retainer groove formed in the bore inner surface, wherein the retainer groove has a shallow portion with a shallow radius and a deep portion with a deep radius that is greater than the shallow radius;
   a retainer configured to be received in the retainer groove, wherein the retainer comprises:
      a radial thickness $T_1$ that is greater than a radial depth $T_2$ in the bore inner surface of the shallow portion of the retainer groove, and
      a split ring with circumferentially overlapping ends; and
   the radial thickness $T_1$ of the retainer is less than or equal to a radial depth $T_3$ in the bore inner surface of the deep portion of the retainer groove,
   wherein the circumferentially overlapping ends are at least partly within the retainer groove.

2. The pipe system of claim 1, wherein the retainer is configured to be fully radially expanded into and seat completely within the deep radius of the retainer groove in the tubular body.

3. The pipe system of claim 1, wherein a radial size of the retainer is configured to radially expand relative to the axis when a pipe is axially inserted through the retainer in the tubular body.

4. The pipe system of claim 3, wherein a chamfer on the retainer or on the pipe is configured to translate axial motion of the pipe through the retainer into a radial motion of the retainer.

5. The pipe system of claim 3, wherein the tubular body is one of a coupling or an integrated bell on an axial end of the pipe.

6. A pipe system, comprising:
   a tubular body having an axis, a bore that is axial, a bore inner surface, and a retainer groove formed in the bore inner surface; and
   a retainer configured to be received in the retainer groove, and an entirety of the retainer is configured to be both axially movable and radially movable relative to the retainer groove during formation of a pipe assembly with a pipe in the bore,
   wherein the retainer comprises a split ring with circumferentially overlapping ends that are at least partly within the retainer groove,
   wherein the retainer groove has a shallow portion with a shallow radius and a deep portion with a deep radius that is greater than the shallow radius, and
   wherein the retainer is axially movable from the shallow portion to the deep portion during formation of the pipe assembly.

7. The pipe system of claim 6, wherein the retainer is configured to automatically engage the pipe without manual intervention with the retainer when the pipe is inserted into the bore of the tubular body.

8. The pipe system of claim 6, wherein the pipe assembly is configured to be reversible such that actuation of the retainer releases the pipe from the tubular body.

9. The pipe system of claim 6, wherein the pipe assembly is configured to be repeatably reversible such that the tubular body, retainer, and pipe can repeatably form and un-form the pipe assembly.

10. The pipe system of claim 6, wherein the retainer comprises a radial inner surface having a chamfer on a corner thereof configured to face in an axial direction of the pipe.

11. The pipe system of claim 6, wherein the split ring comprises a first diameter in a relaxed state, and a second diameter in a radially expanded state, and wherein the second diameter is greater than the first diameter.

12. The pipe system of claim 6, wherein tubular body comprises visual indicia configured to indicate if the tubular body and the pipe are in tension.

13. The pipe system of claim 6, wherein, in response to tension being applied to the pipe assembly, the retainer is configured to engage in the retainer groove at a shallowest radial depth thereof.

14. The pipe system of claim 6, wherein the retainer is configured to:
   radially expand when the pipe is inserted into the tubular body; and
   move axially into the shallow portion of the retainer groove when the pipe assembly is put in tension.

15. The pipe system of claim 6, wherein the retainer comprises a nominal configuration, an expanded configuration, and an engaged configuration, and wherein:
   in the nominal configuration the retainer comprises a nominal diameter relative to the axis prior to formation of the pipe assembly with the pipe;
   in the expanded configuration the retainer comprises an expanded diameter relative to the axis during formation of the pipe assembly, and the expanded diameter is greater than the nominal diameter; and in the engaged configuration the retainer comprises an engaged diameter after formation of the pipe assembly, and the nominal diameter <the engaged diameter <the expanded diameter.

16. The pipe system of claim 6, wherein the retainer consists of one retainer, configured to retain the pipe to the tubular body.

17. The pipe system of claim 6, wherein the retainer comprises radial extensions relative to the axis, and the radially extensions are configured to be manipulated to change a dimension of the retainer.

18. The pipe system of claim 17, wherein the radial extensions are configured to only slidingly engage each other and do not lock together, and the radial extensions are configured to extend through an aperture in a wall of the tubular body; and the aperture comprises recesses, the radial extensions are configured to have an unrestrained position in the aperture, the radial extensions are configured to have a restrained position in the recesses, and the radial extensions and the retainer are configured to be axially movable between the unrestrained and restrained positions.

19. The pipe system of claim 18, wherein, in the unrestrained position the radial extensions are configured to be circumferentially movable and the retainer is radially movable, and in the restrained position the radial extensions are configured to be not circumferentially movable and the retainer is not radially movable.

20. A pipe system, comprising:
a tubular body having an axis, an axial end, a bore that is axial, a bore inner surface, a retainer groove formed in the bore inner surface, and the retainer groove comprises a plurality of different radial depths relative to the axis;
a retainer comprising a split ring with circumferentially overlapping ends at least partly within the retainer groove, and configured to be:
received in the retainer groove, and
radially movable relative to the retainer groove from one of the plurality of different radial depths to another of the plurality of different radial depths; and
a pipe is configured to be mounted in the bore of the tubular body and retained by the retainer.

21. A pipe system, comprising:
a tubular body having an axis, an axial end, a bore that is axial, a bore inner surface, and a retainer groove formed in the bore inner surface;
a pipe configured to be mounted in the bore of the tubular body and having a pipe retainer groove in an exterior surface thereof, and the retainer groove of the tubular body has an axial length that is greater than an axial length of the pipe retainer groove; and
a retainer comprising a split ring with circumferentially overlapping ends at least partly within the retainer groove and configured to be mounted in the retainer groove and the pipe retainer groove for retaining the pipe in the tubular body,
wherein the retainer groove has a shallow portion with a shallow radius and a deep portion with a deep radius that is greater than the shallow radius, and
wherein the retainer has a radial thickness $T_1$ that is greater than a radial depth $T_2$ in the bore inner surface of the shallow portion, and
wherein the radial thickness $T_1$ of the retainer is less than or equal to a radial depth $T_3$ in the bore inner surface of the deep portion.

* * * * *